US008949717B2

(12) United States Patent
Maor et al.

(10) Patent No.: US 8,949,717 B2
(45) Date of Patent: Feb. 3, 2015

(54) METHOD OF CONTROLLING AVATARS

(76) Inventors: Yehonatan Rafael Maor, Tel Aviv (IL); Ofer Rundstein, Tel Aviv (IL); Meishar Meiri, Tel Aviv (IL); Gad Mordechi Maor, Tel Aviv (IL); Adam Rakib, Tel Aviv (IL); Yossi Sadoun, Tel Aviv (IL)

( * ) Notice: Subject to any disclaimer, the term of this patent is extended or adjusted under 35 U.S.C. 154(b) by 175 days.

(21) Appl. No.: 13/297,218

(22) Filed: Nov. 15, 2011

(65) Prior Publication Data

US 2012/0131478 A1 May 24, 2012

Related U.S. Application Data

(63) Continuation-in-part of application No. 13/275,113, filed on Oct. 17, 2011, which is a continuation-in-part of application No. 13/275,186, filed on Oct. 17, 2011.

(60) Provisional application No. 61/394,151, filed on Oct. 18, 2010.

(51) Int. Cl.
*G06F 3/00* (2006.01)
*G06T 11/60* (2006.01)
*G06T 19/20* (2011.01)
*G06F 3/0481* (2013.01)
*G06Q 10/10* (2012.01)
*G06Q 50/00* (2012.01)

(52) U.S. Cl.
CPC .............. *G06T 11/60* (2013.01); *G06T 19/20* (2013.01); *G06F 3/04815* (2013.01); *G06Q 10/101* (2013.01); *G06Q 50/01* (2013.01); *G06T 2219/2004* (2013.01)
USPC ............ 715/706; 715/700; 715/705; 715/753

(58) Field of Classification Search
CPC ....................................................... G06F 3/00

USPC .......................................... 715/706, 700, 705
See application file for complete search history.

(56) References Cited

U.S. PATENT DOCUMENTS

| | | | |
|---|---|---|---|
| 6,559,863 B1 | 5/2003 | Megiddo | |
| 6,772,195 B1 | 8/2004 | Hatleid et al. | |
| 8,578,044 B2 * | 11/2013 | Van Wie et al. | 709/231 |
| 2005/0176502 A1 * | 8/2005 | Nishimura et al. | 463/31 |
| 2008/0040673 A1 | 2/2008 | Zuckerberg et al. | |
| 2009/0053970 A1 * | 2/2009 | Borge | 446/268 |
| 2009/0172539 A1 | 7/2009 | Bates et al. | |

(Continued)

OTHER PUBLICATIONS

Cormen et al., Introduction to Algorithms, Third Edition the MIT Press, Cambridge Massachusetts (2009), Chapter 33, Computational Geometry, section 33.3 "Finding the convex hull", pp. 1029-1039.

*Primary Examiner* — Nicholas Augustine
*Assistant Examiner* — Meseker Takele
(74) *Attorney, Agent, or Firm* — Stephen E. Zueig

(57) ABSTRACT

A method of controlling the position and orientation of user controlled computer generated avatars in computer generated virtual world in a manner that tends to bias the user controlled avatar positions and orientations in a way that sends useful non-verbal social cues to outside observers. These non-verbal cues can include cues such as "this conversation is open to outside participants" and "this conversation is private". The methods can also convey "stage presence" to that can somewhat bias the position and orientation of the user controlled avatars in a manner that takes the viewpoint of an outside observer into account. These effects can be modulated up or down as desired, and may be further modulated by the degree of social connections or past history of virtual world interactions between various users.

22 Claims, 13 Drawing Sheets

(56) References Cited

U.S. PATENT DOCUMENTS

| | | |
|---|---|---|
| 2009/0271714 A1 | 10/2009 | Cox et al. |
| 2010/0076870 A1* | 3/2010 | Fujioka .......................... 705/27 |
| 2011/0157306 A1* | 6/2011 | Lin et al. ........................ 348/43 |
| 2012/0038739 A1* | 2/2012 | Welch et al. ............... 348/14.01 |

* cited by examiner

Figure 4

My Birthday!!
You are Attending · Share · Public Event

| | |
|---|---|
| Time | August 26 at 10:00pm – October 6 at 1:00am |
| Location | AGORA — 400 |
| Created By | Daniel Lopez |
| More Info | Dear guests!<br>For those wondering, I am finally back from my trip to Mexico! Just in time to celebrate my birthday with all of you (wherever you are) !!! I'll be happy to see all of you!<br><br>http://apps.facebook.com/nojesrac/?ref=bookmarks |

Write something...

Attach:

Alan Parson Happy Birthday Danny!! I'll definitely be there :)
August 26 at 4:24pm · Comment · Like · Flag

— 402

+ Select Guests to Invite

17 Attending   See All

- Daniel Lopez
- Jamie Rai
- Nikki Shields
- Jonathan Heffels
- Dina Rose
- Aaron Bernstein
- Chris Landry
- David Carson

404

Figure 9
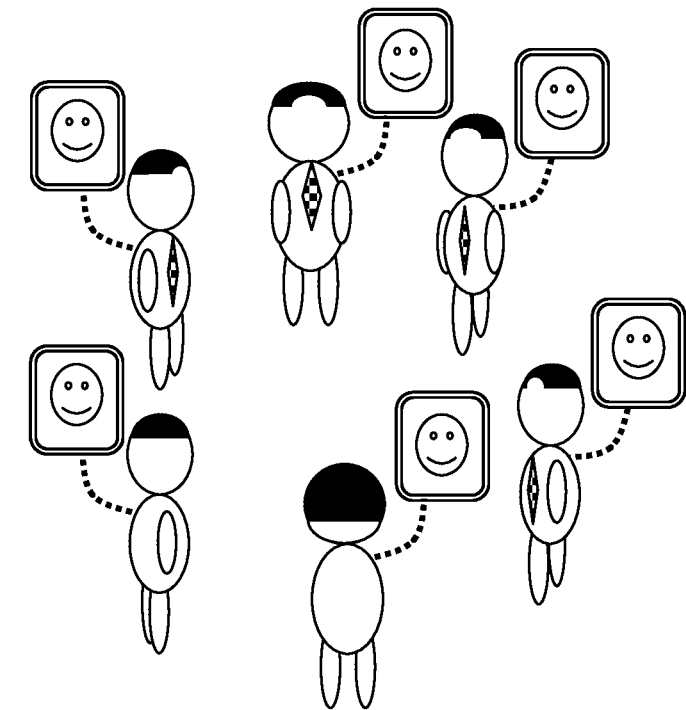
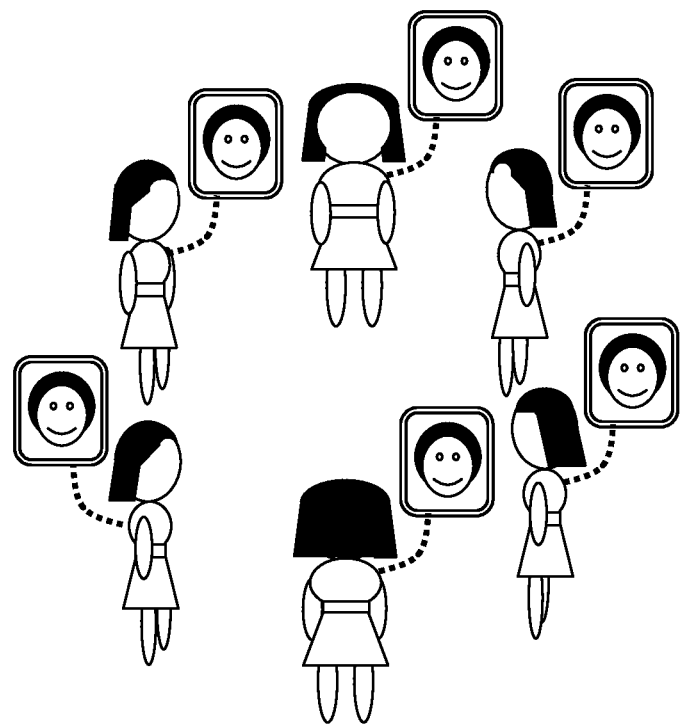

Figure 10
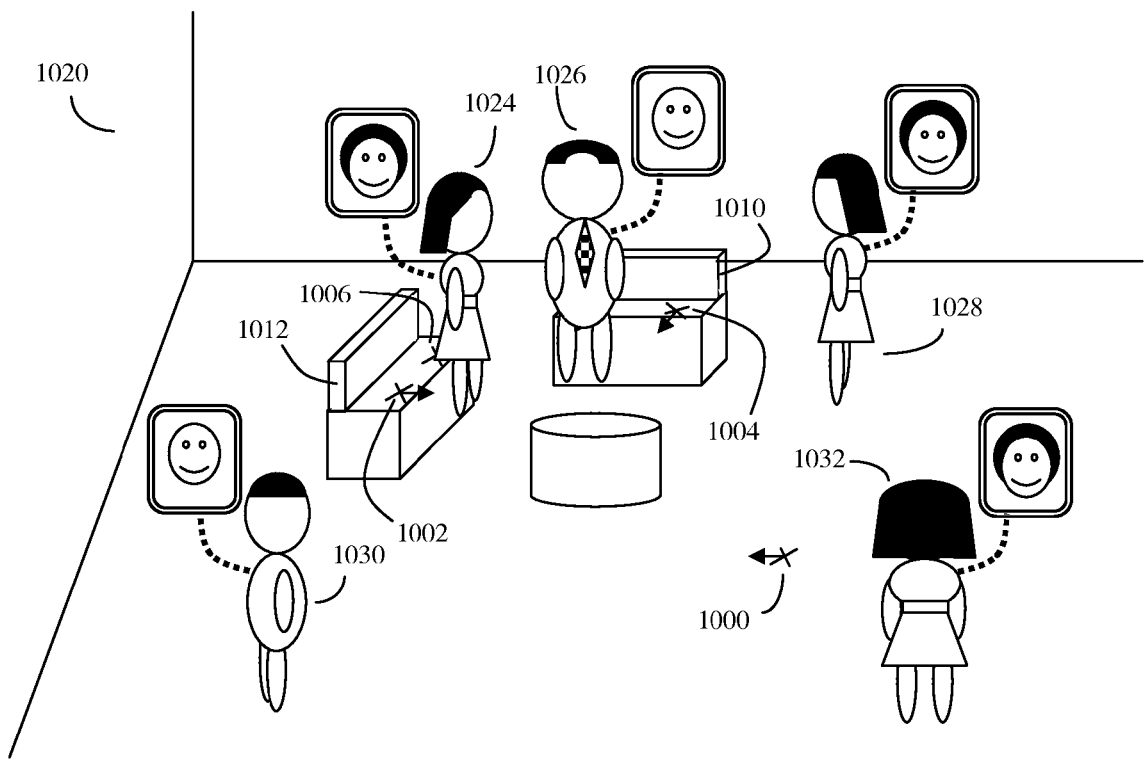
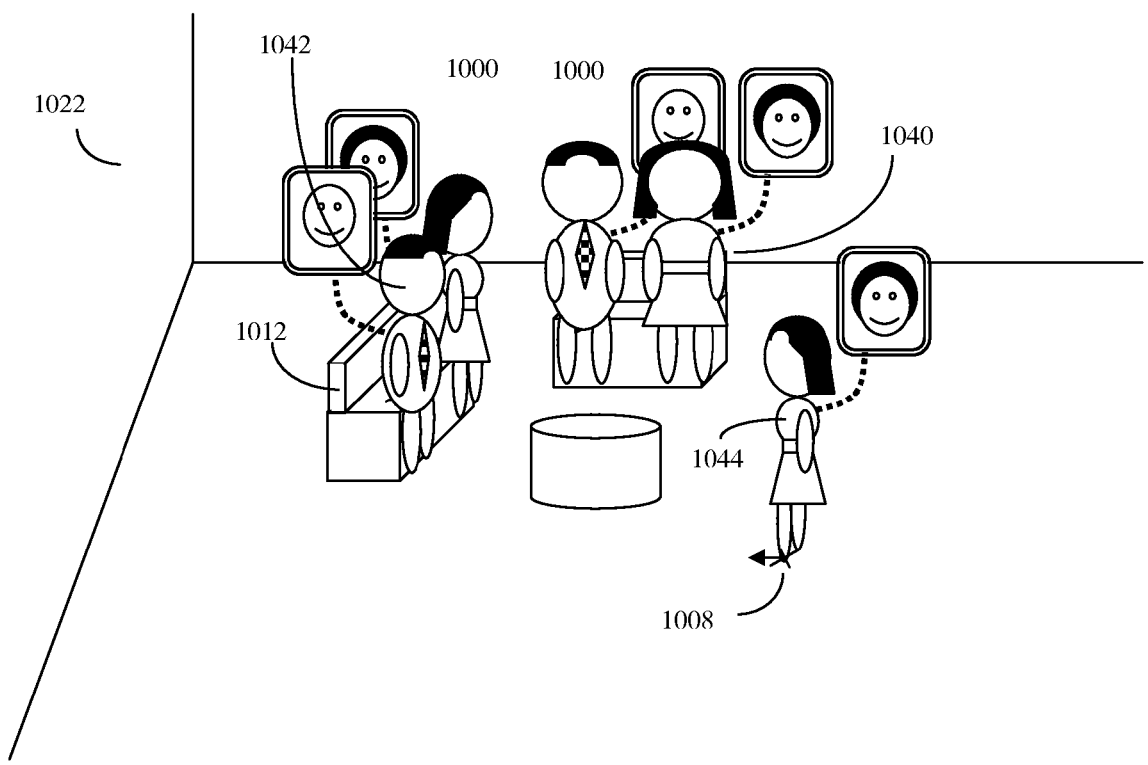

Figure 14
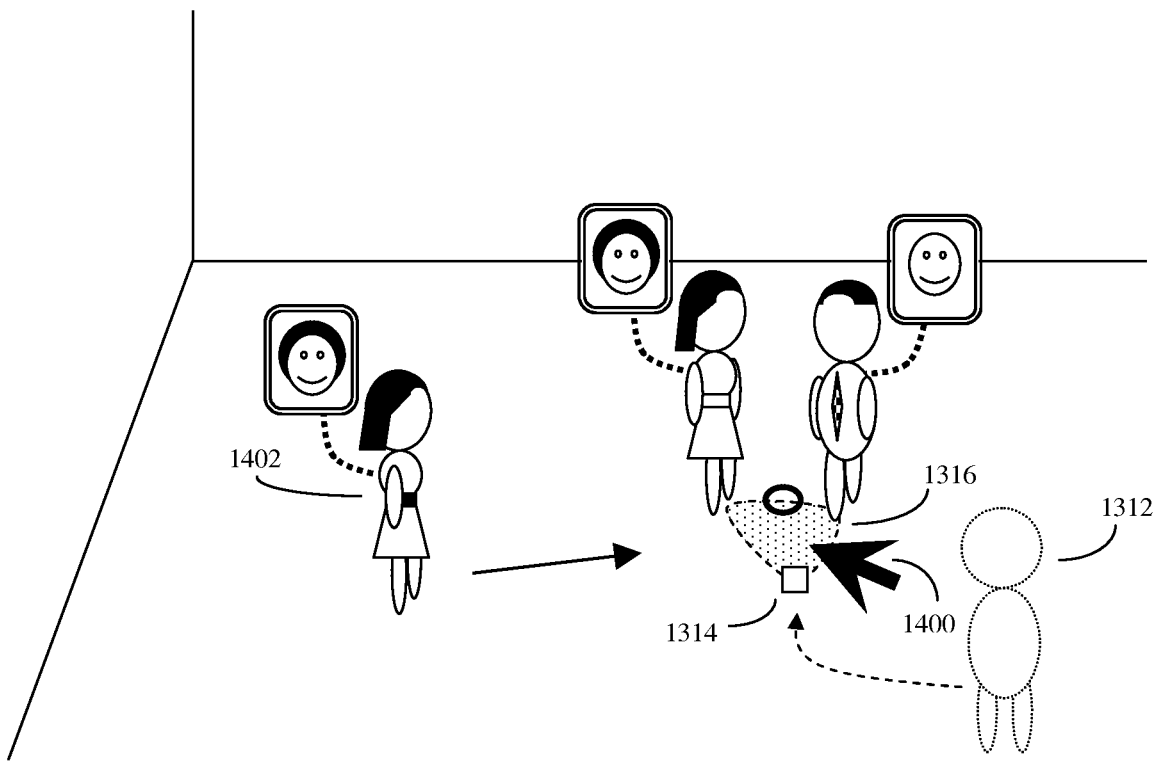
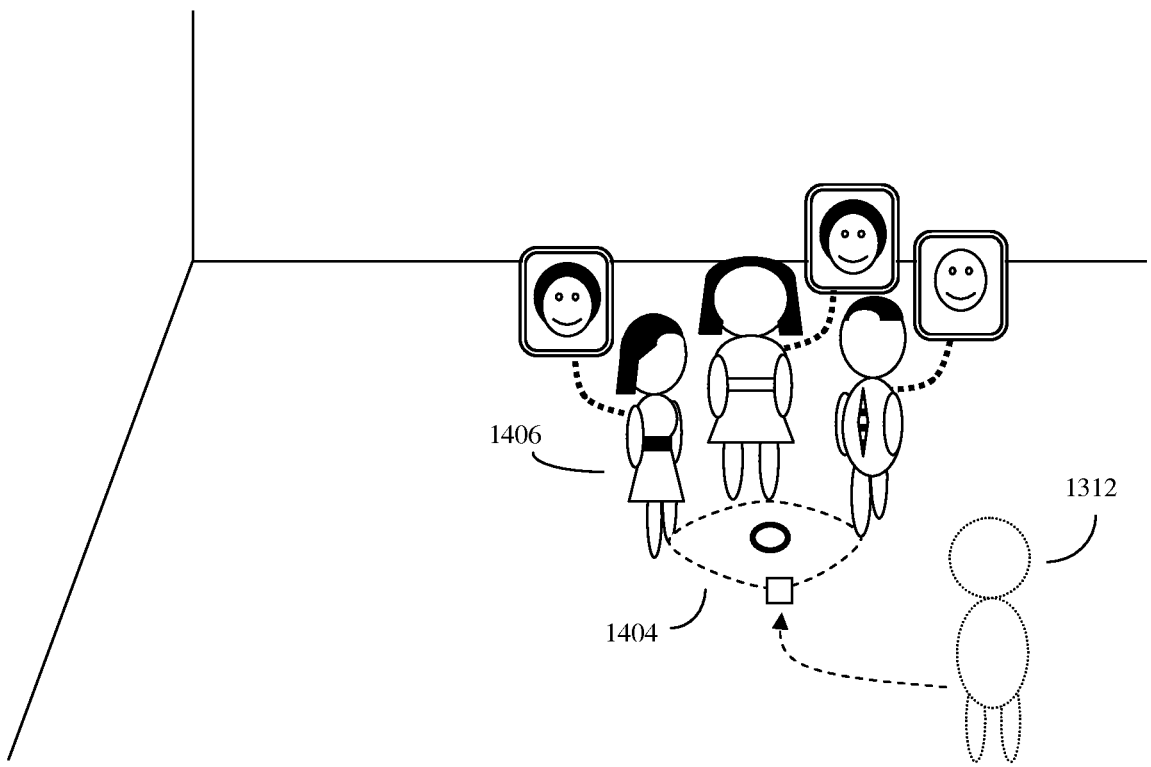

METHOD OF CONTROLLING AVATARS

CROSS REFERENCE TO RELATED APPLICATIONS

This application is a continuation in part of U.S. patent application Ser. No. 13/275,113, "SOCIAL NETWORK BASED VIRTUAL ASSEMBLY PLACES", first inventor Yehonatan Rafel Maor, filed Oct. 17, 2011; application Ser. No. 13/275,113 in turn claims the priority benefit of provisional patent application 61/394,151, "SOCIAL NETWORK BASED VIRTUAL ASSEMBLY PLACES", first inventor Yehonatan Rafel Maor, filed Oct. 18, 2010; this application is also a continuation in part of patent application Ser. No. 13/275,186, "CONTROLLING SOCIAL NETWORK VIRTUAL ASSEMBLY PLACES THROUGH PROBABILITY OF INTERACTION METHODS", first inventor Yehonatan Rafel Maor, filed Oct. 17, 2011; Ser. No. 13/275,186 in turn also claims the priority benefit of provisional patent application 61/394,151, "SOCIAL NETWORK BASED VIRTUAL ASSEMBLY PLACES", first inventor Yehonatan Rafel Maor, filed Oct. 18, 2010; the contents of all applications are included herein by reference.

BACKGROUND OF THE INVENTION

1. Field of the Invention

The invention is in the area of computer methods to control online avatars used in virtual worlds and computer simulations of real world environments.

2. Description of the Related Art

Prior art online social networks offer a chance to stay connected with existing friends, meet new people, express one's self and one's thoughts, share photos, links and posts, and also offer additional applications such as games and dating.

Although the online social network market has expanded very rapidly in recent years, the market is dynamic, as different particular social networks and their associated organizations can increase and decrease in popularity. MySpace for example was initially a very strong contender in this field, but then fell out of favor. At present, the field is dominated by Facebook, with other major sites including Twitter, LinkedIn, MySpace, Ning, Google+ and Tagged.

As of October 2011, Facebook claims more than 800 million active users, that more than 50% of their active users log onto Facebook every day, and that the average Facebook user has approximately 130 friends.

At the same time, online graphical social games, such as Zynga (makers of popular Facebook games such as Mafia Wars, Farmville, and the like), World of Warcraft, and the like have also become popular. Zynga, for example itself has millions of active users. However these prior art social games generally have user bases that are composed of users who have signed up for the game itself. Although individuals in these games may design avatars (i.e. computer representations of the user's game alter ego) to play the game, these avatars will generally bear little relationship to the user's real life appearance and characteristics. Indeed this is part of the appeal of these games, because a small person in real life, for example, may want to portray themselves as large and imposing in the game.

Previous art in this area includes U.S. Pat. No. 6,772,195 B1, US application US 2009/0271714 A1, and US 2008/0040673 A1.

Avatars can be a useful method to facilitate online social interactions, because they enable a user to draw upon his or her real world experience, and make the online interactions more realistic and compelling. In particular, prior art, such as Megiddo, in U.S. Pat. No. 6,559,863 discussed use of avatars in a cocktail party type setting, where the size of the user's avatars or the size of the avatar's conversation text differs as a function of the avatar's location in the virtual room.

Hatleid, in U.S. Pat. No. 6,722,195 discussed various methods of controlling online avatars to produce conversational "chat clusters". Other workers, such as Bates, US patent application 2009/0172539 discussed methods of incorporating various trust levels into avatar based online communications.

Despite these advances, online communications employing avatars still must overcome an effect that has been termed the "uncanny valley". This a problem shows up when synthetic representations of humans (e.g. avatars) act enough like humans to generate expectations of normal human appearance or behavior, but then frustrate these expectations, thus causing a feeling of strangeness of lack of comfort on the part of the real human users of the system.

Thus improved methods of controlling avatars would be desirable and useful, because such methods would facilitate online computer assisted communications among various human users.

BRIEF SUMMARY OF THE INVENTION

Despite the proliferation of online social networks and games, methods of meeting new people online are still inadequate. Social networks mainly allow members to connect with friends that they already have met, and online games mainly allow users to connect for the limited purpose of playing the games. Thus there is still nothing that allows an individual to meet new people with the same degree of ease and reliability that exists for example, in a real life social party situation.

In a real life social party, friends may invite other friends, and these friends will in turn invite both friends of friends, and also friends of friends of friends, and so on. Because the initial guest list is at least partially screened, an individual at a real life social party has some assurance that the stranger that they may meet will likely have at least a few things in common with them, because the individual and the stranger are connected by only a few degrees of social separation. This helps insure compatibility, and increases the chance that the meeting may ultimately be found to be worthwhile from a romantic, friendship, political or business perspective. In other words, the probability of a real-world party attendant having a positive interaction with other party attendees is often fairly good.

In real life, one of the reasons why people go to real parties is to expand their social networks, and potentially reap the benefits that an expanded social network brings to almost every area of life. However neither prior art social networks nor prior art social games enable the same type of natural social network expansion that is possible in an everyday party setting, where all party members present will only have at most a few degrees of social separation from each other.

At the same time, due to the statistics of the proliferation of online social networks, and the large amount of time individuals spend interacting online with the social networks each day, the social network environment has tended to supplant much of the time that individuals would, in earlier years, have spent interacting in real life. For example, when the average user with about 130 online friend connections enters a social network, at any given time it is now statistically likely that about 30 of the user's friends will also be online.

In one embodiment, the invention provides a virtual environment or virtual platform where social networks and community website users are able to gather online much as they would in real life. The goal is to capture as closely as possible the vivid details of real life environments, such as parties, where people can not only meet existing friends, but also meet friends of friends, and more distantly connected individuals, that they might not have a chance to meet otherwise.

In order to do this, a number of different computer implemented methods are required. These include software features that 1) create a social interaction platform that is layered over a previously established social network populated with real-world data from real-world users; 2) help the user make new acquaintances that are significant to his/hers real life by providing virtual environments (rooms) populated with other users/members where the probability of (positive) interactions is generally high; and 3) provide the user with a guide to various virtual events where again, the probability of encountering other members and having a positive interaction is high.

Towards this end, use of avatar based virtual meeting rooms, virtual parties, virtual conversations and the like can be an important tool towards facilitating these social interactions. This is because in the real world, participants in a social setting are constantly sending a large amount of non-verbal data concerning their social connections and interest in communicating. In real life, this is communicated non-verbally though how individuals position themselves, who they stand next to, and how long they may interact before moving on to speak to the next person. Although this non-verbal information would otherwise be completely lost in a text based or even speech based communication forum, through the use of avatars, these non-verbal messages can in principle, be sent by various methods such as relative avatar position, orientation, and motion.

Not all avatar based systems will be equally effective in this regard, however. The invention is based, in part, on the insight that in order to facilitate interactions by sending useful non-verbal communication information, an avatar based online virtual world (particularly a virtual world based on real world social network users), should take particular care in controlling the avatars. In particular, such a system should ideally take particular care to control and present the avatars in a manner that avoids creating user discomfort, avoids miscommunication, and ideally enhances the possibility of making new social connections.

The invention is also based, in part, on the insight that in real life, the way people stand in various conversation clusters in a social gathering can send non-verbal messages encouraging or discouraging others to join in the conversation. Thus in an avatar based online social interaction system (particularly in a virtual social environment where there may be multiple independent conversations going on in the same virtual room), ideally the system should control the positions, orientations, and other behavior of the avatars in a manner that both does not inadvertently send non-verbal messages discouraging others from participating. In fact ideally, unless privacy is desired, the avatars in such an environment should preferably send non-verbal messages that encourage further online social interactions.

The invention is also based, in part, on the insight that the acting world (i.e. stage and cinema) has also grappled with the general problem of how to draw onlookers into an artificial world filled with a plurality of conversations. In the acting world, actors are expected to have "stage presence", in which to at least some extent, they arrange their respective positions and orientations with respect to the audience, as well as each other. This helps draw the audience's attention into the "virtual world" of the play or movie. Although, actors using "stage presence" techniques may thus be standing and oriented in a slightly artificial manner that not quite the same as it would be in a non-staged setting, this is considered a desirable tradeoff. This is an artistic convention that essentially everyone accepts and is comfortable with, and it encourages audience interest and involvement.

Thus, at the broadest level, the invention is a method of controlling the position and orientation of computer generated avatars in computer generated virtual world in a manner that tends to bias the avatar position and orientation in a manner that sends non-verbal cues to outside observers that the conversation members may be open to further observer participation in the conversation. To this end, the system can make use of a variety of different techniques. These techniques include the use of "marks" that can be used to position avatars in an appropriate manner, as well as various methods to bias the position and orientation of avatars in a conversation group in a manner that avoids sending non-verbal "keep away" messages, and instead sends non-verbal "feel free to join" messages. Further, by modulating the extent of these avatar based non-verbal messages, based on estimations of the probability that any given member's avatar may favorably interact with other member's avatars, system efficiency can be improved. That is a user can use the non-verbal information to seek out more favorable conversation groups to join, and avoid wasting time interacting with less favorable conversation groups.

To do this, in one embodiment, the invention may be a method for arranging the positions of a plurality of avatars during a computerized virtual conversation in a manner that is somewhat inspired by stage representations of party conversations. Here the location of the various avatars relative to each other, and relative to the location of one or marks (which can impart a preferred avatar orientation) in the vicinity of the avatars can be noted, and avatars standing near or on these marks can be positioned in this preferred orientation. These marks can be embedded into online computer generated virtual furniture (e.g. couches, chairs, and the like), and can help the creators of the online world create natural conversation settings (e.g. couch and table arrangements) for marked (e.g. avatars sitting on marked virtual furniture) avatars that can facilitate conversations. The method further arranges the "unseated" (unmarked) avatars around any "seated" avatars in the conversation group in a stage-like semi-natural setting. The method does this by first generating a mathematical shape, such as a convex hull, based on the location of all marked and unmarked avatars, as well as the preferred avatar orientations of the marked avatars. This convex hull shape is drawn such that the preferred avatar orientations of the marked avatars generally face the interior of this convex hull. The unmarked avatars are then automatically repositioned along the perimeter of this convex hull.

Thus for example, although the particular avatar's user may have gross control over the avatar position and location, the computer system controlling the online virtual room or world may automatically exert fine control by having the avatar automatically make a few steps to one position or another position to optimize the avatar grouping for this particular conversation, or automatically change the orientation of the avatar as well.

In further embodiments, the shape of the convex hull may be distorted or biased in a manner that somewhat recognizes the presence of the user or user's who are viewing the conversation in the graphical user interface of the user computerized device that is used to see this virtual world. This method, which recognizes that the user as observer (user observer) has a role not unlike that of the audience for a play or movie, takes into account the approximate location of the user's virtual location in his or her graphical user interface display screen. According to the method the distribution (e.g. position, orientation) of the avatars along the perimeter of the convex hull may also be biased in a manner that, for example, tries to avoid having the other avatars turn their virtual backs on the observer. This method can instead strive to arrange the conversation in a manner that is appears open and friendly to the observer. The arrangement of the avatars along the perimeter may, for example, have an opening or gap in the direction of the user observer. This helps send non-verbal message that the user is welcome to join that particular conversation.

The extent to which shape of the convex hull is distorted in the direction of the observer, and the extent to which the avatar distribution (position, orientation) along the perimeter of the convex hull may biased with respect to the observer's direction may further be adjusted by one or more computer system parameters, from a minimal effect to a larger effect. This gives the system administrators an additional tool to use to send non-verbal cues to the user/observer to help facilitate online social interactions.

In other embodiments, the system may also bias the distribution (position, orientation) of conversing avatars with respect to either the user observer, or towards nearby non-conversing avatars (which may be controlled by the same user or users who are also observing the virtual world), based on probability to interact (PTI) considerations as per parent application Ser. No. 13/275,186, the contents of which are incorporated herein by reference

BRIEF DESCRIPTION OF THE DRAWINGS

FIG. 4 shows a web page from a user's Internet based social network, here using Facebook as an example.

FIG. 9 shows an example of various avatar orientations. Often the computerized system may generate at least four avatar orientations or angles, and often six, eight, or even more orientations or angles. Head orientations independent of body orientations may also be implemented.

FIG. 10 shows how markers (e.g. position and orientation markers) embedded in various locations and objects (such as furniture) in the virtual world or room may be used to control relative avatar orientations in a conversation group.

FIG. 14 shows how a user may click on a region within the complex hull generated by two conversing avatars, and possibly an invisible observer avatar that represents the vantage point of the user, to move the user's avatar to join an ongoing conversation.

DETAILED DESCRIPTION OF THE INVENTION

Definitions

Virtual room or Virtual world: For the purposes of this discussion, the virtual world that the various avatars will be operating in may be graphically portrayed in a 2½ dimensional format. Although other formats, such as a true 3 dimensional format may be used, a 2½ dimensional format has certain advantages because the artificial 2½ dimensional format can show all avatars as being approximately the same size, regardless of their position in the room.

Figure 11:
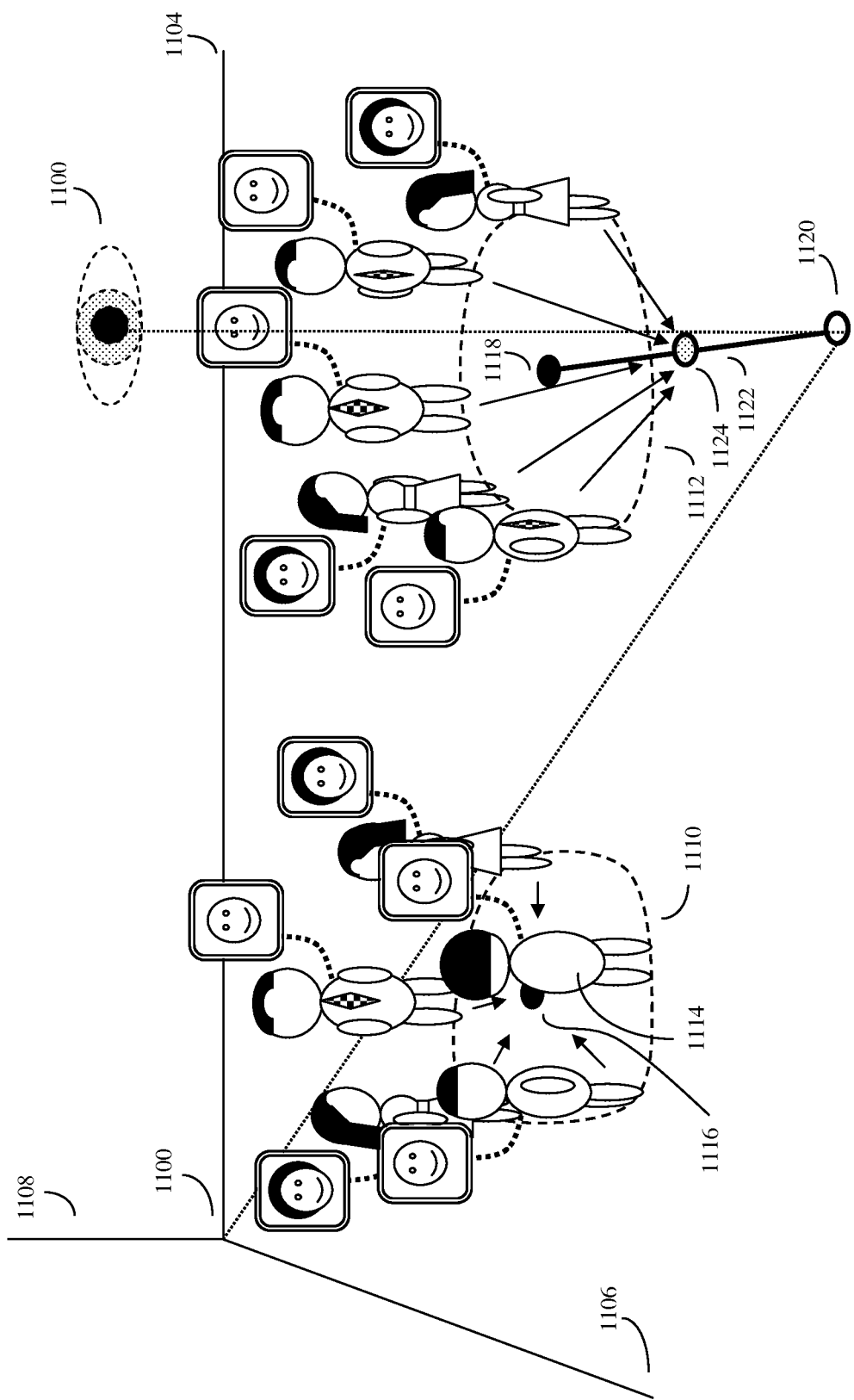
FIG. 11 shows two conversing groups of avatars in a virtual room, as seen in 2½ dimensional perspective from a user observer who is observing the virtual room from a somewhat elevated virtual position located some distance away in from the other conversation groups. This will be shown in the user observer's computerized graphical user interface. The left group of conversing avatars are positioned and oriented in a manner that is unaware of the position of the user observer, while the right group of avatars are positioned and oriented in a manner that to some extent is adjusted or biased according to the relative position of the user observer.

As will be discussed in more detail in FIG. 11, the avatars may be shown as walking along an X, Y plane defined by the virtual ground or floor of the scene. The user observer may observe this scene from a elevated virtual perspective above the heads of the avatars along the height or "z" axis, and often from a virtual location that if projected onto the X,Y plane of the scene, would be somewhat displaced from the location of the other avatars. As an example, the observer's location may often be assumed to be from the perspective of the upper distant corner of the virtual room.

GeoChat: A proximity based online virtual world conversation that shows the avatars of the various conversing members in the graphical user interface (often a web browser) of a computerized device. Here often each user will have their own computerized device, and these will be usually connected to one or more system servers by network connections such as the Internet.

Center of conversation: This is the mathematical center of the conversation, often determined by the average location of the conversing avatars.

Center of conversation viewpoint: This is the point all members of a conversation try to look at, which may or may not be located at the mathematical center of the conversation.

Conversation area: An area on the (x, y) plane where the conversation takes place. Conversation areas belonging to different conversations generally do not intersect and avatars belonging to users who are not participating by the conversation will generally be automatically directed by the system to walk around the conversation area rather than walk through the conversation area.

Chat space. The chat-space is the user interface component used to convey the text version of the online conversation. Typically the chat space will consist of a single input box and a conversation log. See, for example, FIG. 7.

Radius: A distance calculated from the mathematical center of conversation. In some embodiments, such as simple embodiments where all conversation members are arranged in a circle, all conversation members may be kept within a given radius of the center of conversation. In other more sophisticated embodiments, where the conversation members may be arranged in a more complex shape such as a complex hull shape, different members may be located along the perimeter of the complex hull, which is not necessarily always located at the same distance from the center of the complex hull.

Positioning and repositioning: Often, when a new user tries to join an existing conversation from "far away", by clicking on the conversation (e.g. see FIG. 14) the system will walk his avatar over, adjust the shape of the conversation area as appropriate, reposition the avatars and position his avatar at some point along the perimeter of the new conversation area. This might require the perimeter of the conversation to grow to accommodate the newly arriving avatar. When an avatar exits an existing conversation, perimeter of the conversation may shrink, and the avatars of the remaining members might require repositioning so that they are again fit on this perimeter.

Orientation or Facing: Turning the face or orientation of the user's avatar in a preferred direction, such as a direction towards the center of the conversation, or other direction (e.g. see FIG. 9).

Sound barrier: A virtual obstacle in the room, such as a virtual wall, where in a real room, standing on one side of the obstacle would tend to obstruct real conversations.

Ear contact: A user is said to be in ear contact of a conversation if one can draw a direct line connecting his avatar and the center of conversation without passing through any sound barriers.

Group conversation: A conversation with more than 2 participants.

Context of the Invention:

Before going into a detailed discussion of the various avatar control methods, which are the main focus of this disclosure, a discussion of the rather unique Agora/Shaker social network based virtual world which inspired this invention, and in which this invention is particularly useful for, is in order.

Although the avatar control methods described herein may be used in a wide variety of different virtual world systems and environments, in a preferred embodiment, the invention's avatar control methods will be used in a social network based virtual world, which may in some embodiments be a realistic virtual world, although non-realistic virtual worlds can of course also be used.

An example of such a preferred social network based virtual world, named "Agora", was previously described in applicant's parent patent application Ser. No. 13/275,113, "Social Network Based Virtual Assembly Places", which in turn was based on earlier provisional patent application 61/394,151, the contents of which are incorporated herein by reference. Other aspects of the Agora/Shaker system, such as PTI methods, were also discussed in parent application Ser. No. 13/275,186, the contents of which are also incorporated herein by reference.

In this specification, this social network based virtual world will often be called by its newer commercial name of "Shaker" or "Agora/Shaker". With the exception of the name change, however the teachings of original provisional application 61/394,151 with respect to Agora should, absent discussion otherwise, be assumed to apply to "Shaker" and this specification as well.

Note also that in this specification, the terms users and members, user/members or member/users are used interchangeably. Further, since we are dealing with a system that creates virtual world avatars based on the user/member real world social network data, whenever avatars are discussed, it should be assumed that each avatar is controlled by a unique human user who is registered on a social network. Similarly, when members or users are discussed, it should be assumed that they are represented by avatars in the virtual world.

Agora/Shaker is based on multiple inventions, many of which leverage off of each other. For example, as will be discussed in more detail shortly, the PTI algorithm methods described in parent patent application Ser. No. 13/275,186 may optionally be used to facilitate the Avatar control methods of the present invention.

Here, in order to better facilitate an understanding of the why the invention's avatar control and GeoChat control methods are so very useful in a social network based virtual environment, a series of various social network virtual environment functions, as implemented in the Agora/Shaker system, will be described. Then, after the overall functions have been described, the specific avatar control methods and algorithms that help support and enhance these various functions will be shown in detail.

The Agora/Shaker social network based virtual world or environment may be viewed as being a system and method of providing at least one computer network virtual meeting environment for a plurality of avatars. This method will generally comprise associating each of this plurality of avatars with the human user or member information from at least one social network, such as Facebook, which itself will be comprised of many (often millions) of different human users or members. Here the social network will preferably be a popular and established social network such as Facebook that already contains user information regarding the real world social interactions between the users (e.g. friends, friends of friends, and so on), user real world photographic information, and user real world biographic information.

Figure 6:
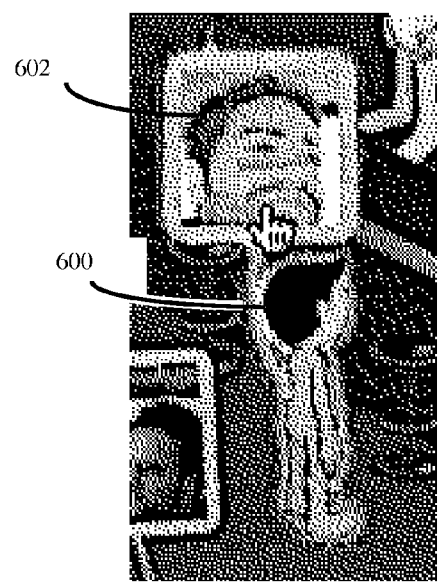
FIG. 6 shows a close-up of the user's avatar, showing his associated social network photograph.

The social network user photographic information, such as the user's profile picture (e.g. FIG. 4 (402), FIG. 6 (602)), user biographic information (such as the user's sex) and the like can be used to provide visual labels and appearances for these avatars, thus producing a plurality of social network labeled or configured avatars. These social network labeled or configured avatars may be used to populate the invention's various online virtual meeting environments.

Typically these virtual meeting environments will be populated with various social network labeled avatars, usually by invitation or by a user's finding the virtual event on a virtual event search engine, which may be PTI optimized for this purpose.

Here, as per Ser. No. 13/275,186, the PTI (probability to interact) is an estimation of the probability of interaction (PTI) between two or more avatars sharing the same online virtual environment; each avatar being associated with a different member of an online social network. The PTI is composed of both virtual world interaction data and real world interaction data between the members. For example, the PTI can be composed of a virtual world PTI predictor value, which is composed of the time history of virtual world interactions between the various members, and a social connection PTI predictor value based on the degree of social connection similarity between these members. The aggregate function of these two predictor values can be used to produce an overall PTI value, which according to the present invention can be used to control the interaction between the various avatars in the online virtual room or virtual world.

Figure 3:
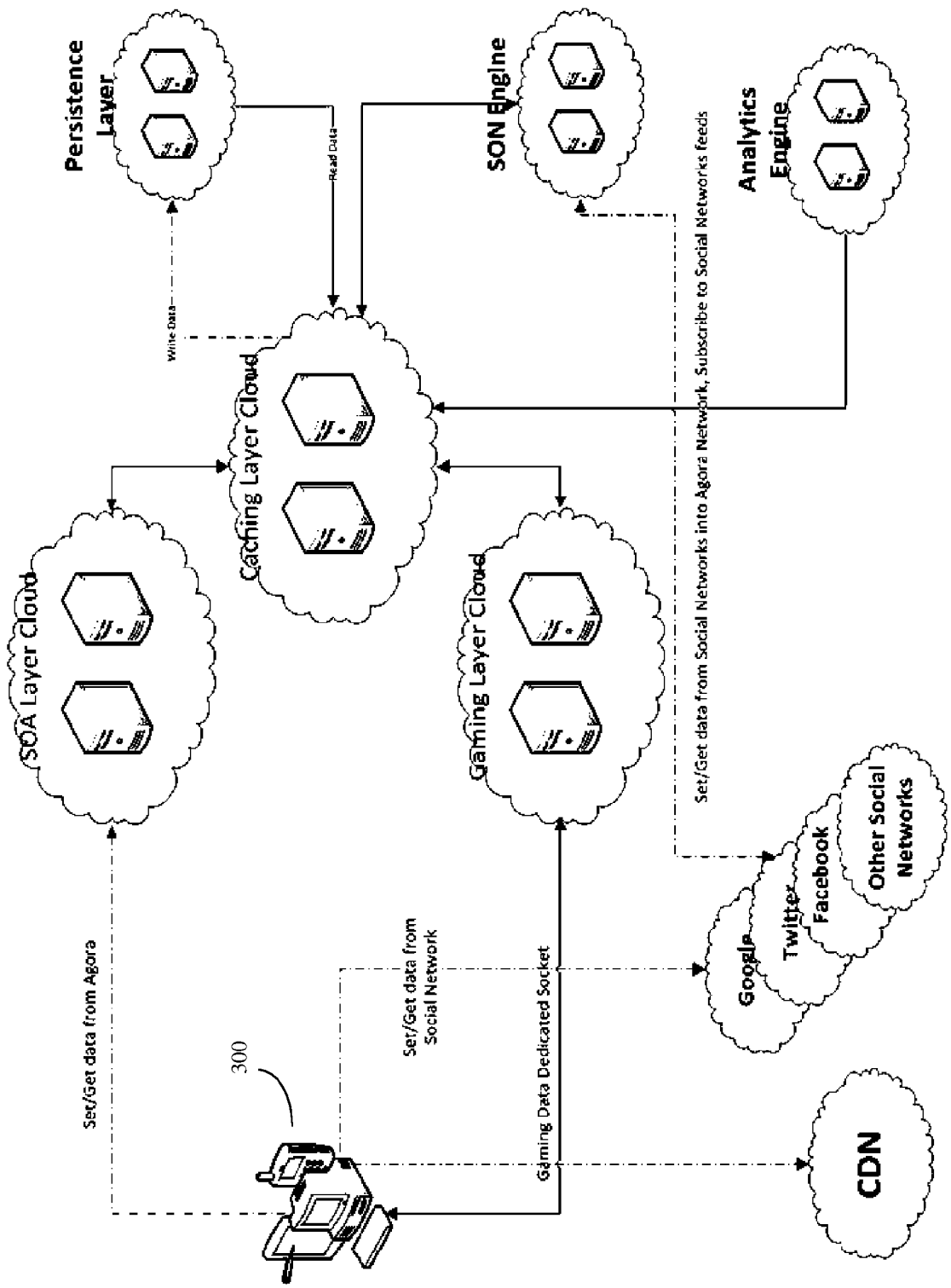
FIG. 3 shows a network diagram showing one possible set of Internet network interconnections between the computer servers and other computerized components that control various online social networks, the computer servers and other computerized components that control the Agora/Shaker system, and the computerized devices of the various users used to visualize the online virtual word.

These avatar populated virtual meeting environments may be displayed on the graphical user interfaces (often web browsers) of computerized network (often the Internet) connected computerized devices (often computers and/or smart cellular phone devices, see FIG. 3, (300)) running under the control of at least some of the various social network users. Using this system and method, the users may control the movement of their respective social network labeled avatars within these virtual meeting environments, interact with the social network labeled/configured avatars belonging to other users, informally or formally exchange information, and obtain at least some social network user information based on these interactions.

Although the Agora/Shaker social network based, realistic virtual world, may run on a wide variety of different social networks, in view of Facebook's present large (>60%) market share, many of the examples and discussion in this disclosure will use the Facebook social network as an example, and will also use the Facebook social network naming convention to describe various social network functions. This use of Facebook examples and terminology is intended as a concise way to convey some of the complex social network functionality, but is not intended to be limiting. In alternative embodiments, the invention may be run on other social networks (e.g. MySpace, Google+, Google+ Circles, etc.) and may employ functionality similar to Facebook functionality under alternate names.

Many of the Agora/Shaker options described in this invention will operate better if the Agora/Shaker users agree to set at least some of their social network privacy options at a lower level. In general Agora/Shaker may be designed to operate at multiple social network privacy settings, inform users as to their privacy settings as the user desires, and also suggest privacy settings that attempt to strike a balance between the user needs to expand his or her social network, and the user's competing needs for certain levels of privacy. Depending upon the event, some events may request a temporary lower privacy setting as a condition for attendance, and optionally allow the user to have the system automatically restore the previous privacy settings upon exit. Other events may allow users with all privacy levels to attend. For the purposes of the various examples and embodiments discussed in this disclosure, it is assumed that all users have set their privacy settings to minimal level (i.e. minimal privacy, expose a lot of personal information), at least for the duration of the Agora/Shaker event.

Figure 1:
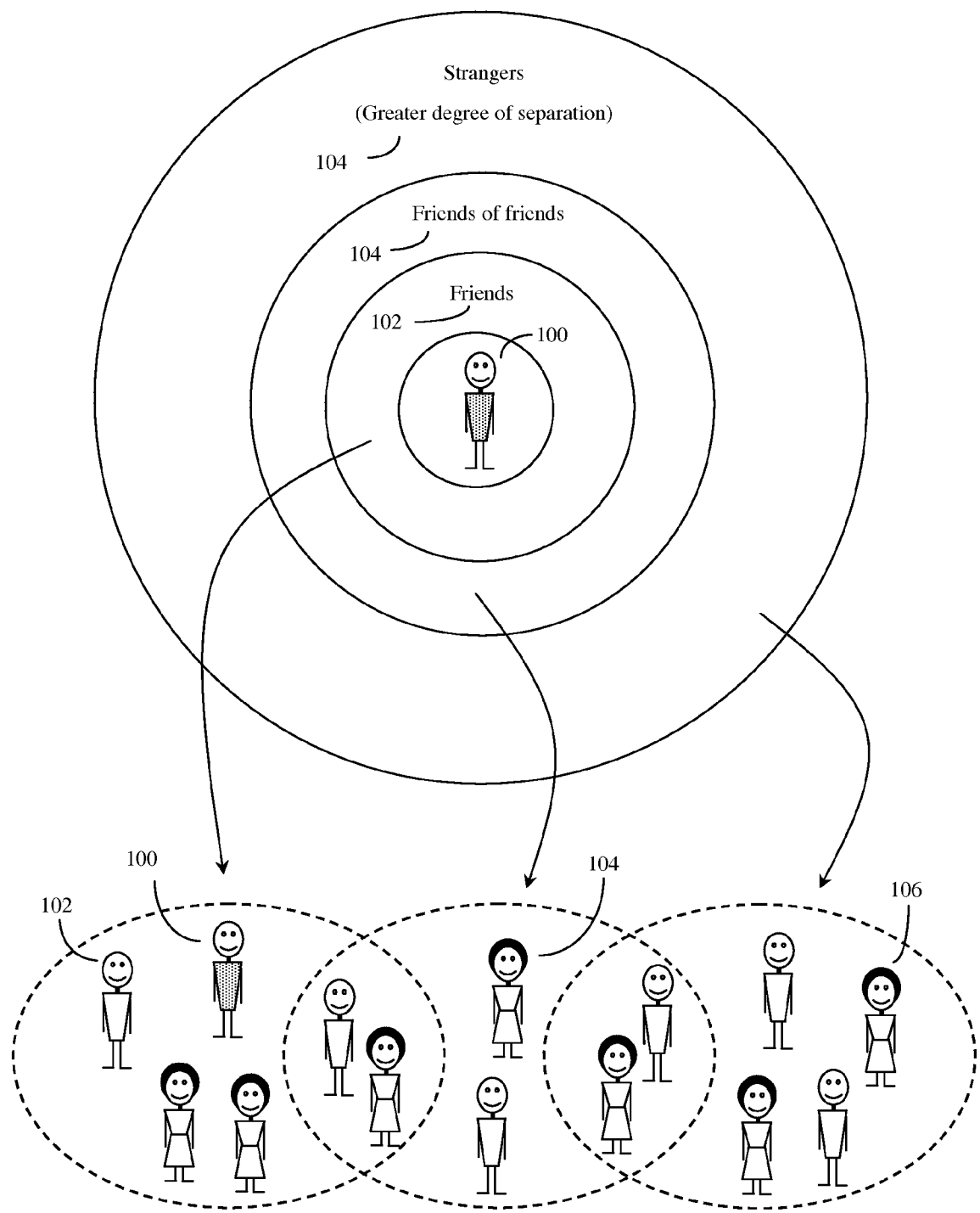
FIG. 1 shows two Venn diagrams of an individual's real-world social network, showing how an individual will have an immediate group of friends, a group of friends of friends, as well as more distant social network degrees of separation as well.

FIG. 1 shows the basic social model behind much of the Agora/Shaker system. This model of social interactions assumes that any individual's real-world social universe consists of first himself or herself (100), followed by a layer of friends and trusted associates (102) that the user knows directly. In a social network, this layer (102) is typically called a "Friends" layer. Surrounding this "friends" layer is the user's natural social environment, which will normally consist of associates or friends of the user's friends (104). In social network terminology, this second layer is typically called a "Friends of Friends layer" (104), which is distant from the user by at least one degree of separation. This second layer can occasionally also contain more remote acquaintances connected to the use by two degrees of separation. Finally there is a layer composed of friends of friends of friends or still more distant relationships (106). Although in the real world, of course, sometimes total strangers can meet and form a close relationship, on a statistical basis, most of the time that an individual meets new people in the real world, the new people are separated from the individual by only one or two degrees of social separation. This relatively close relationship tends to foster trust and congeniality, because often the two "strangers" share a set of friends or acquaintances in common. Agora/Shaker makes extensive use of the fact that this one or two degree of separation information can, given the proper privacy waivers, be extracted from pre-existing social networks.

Figure 2:
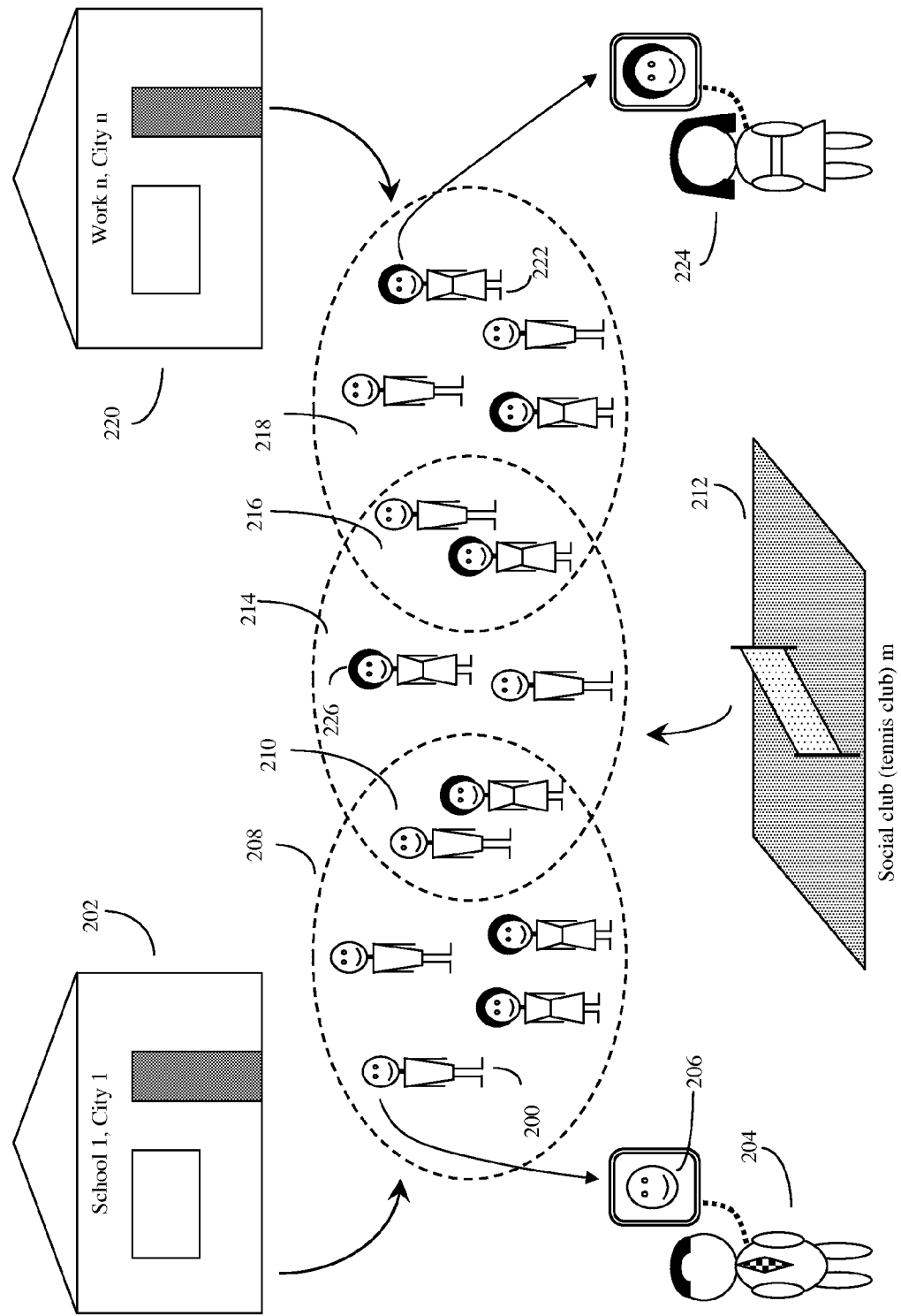
FIG. 2 shows an example of some of the various real world social connection interactions between members of a social network based online virtual environment. These interactions can be used to generate the social connection probability to interact (PTI) predictor value, which in combination of other data (such as the history of virtual world interaction between members) can be used to generate an overall PTI value, which in some embodiments may be used to control avatar position and orientation.

FIG. 2 shows a simplified overview of some of the real world interactions between the user/members of the Agora/Shaker system. Here for example, our user of interest (200) attends school 1 in city 1 (202), and when on the Agora/Shaker system, user/member (200) is represented by avatar (204). This avatar may be easily visually distinguished from other avatars because, among other things, his avatar (204) shows a social network photo (206) of user (200).

Here further assume that the user's real world friends (208) are all drawn from the students of real world School 1 in City 11 (202). Some of the friends (210) of user (200) also attend an outside real world social club (212), such as a tennis club, where they meet and become friends with other individuals (214), (216). Individuals (214) and (216) are thus "friends of friends" in social network terminology. Further assume that some (216), (218) of the other members of the social club (212) are drawn from employees of real world workplace "n" in nearby city "n" (220). Here, for example, one of the other members (222) of the social club (212) works at workplace (220), and when she goes online in the Agora/Shaker system, she is represented by avatar (224). Here, the fact that user (200) and (222), when meeting in the online Agora/Shaker virtual environment, have friends of friends in common somewhat increases the probability that they may share other things in common as well, and this increases the chances of a good probability to interact (PTI) over the random baseline PTI.

In addition to the PTI predictor values based on social connections as shown in FIG. 2, PTI calculations can also incorporate the time history of virtual world interaction between members as well. Here for conciseness, an extensive discussion of PTI are omitted, however discussion from Ser. No. 13/275,186 are incorporated herein by reference; in particular see Ser. No. 13/275,186 FIGS. 12-19 and accompanying discussion.

FIG. 3 shows one embodiment of the main computer network and main components of the Invention's Agora/Shaker architecture. The various Agora/Users interact with the Agora/Shaker system though the graphical user interfaces [often web browsers] of their various computerized devices (300) (e.g. desktop or laptop computers, tablet computers, Smartphones, and the like) via standard network (usually internet) connections. The rest of FIG. 3 shows the "back end" of the system where the various servers and other elements interact to produce the various output as seen by the various users.

These other components include 1) an SOA Layer Cloud, which may handles all business logic, including but not only, handling Shaker virtual events, handling users, handling mailboxes, DOS/FOF information and more; 2) one or more Gaming Servers, which may handle all interactions between users in the rooms, for example: user moves, user talks, and other functions; 3) a SON Engine, which may be responsible for all interactions with external social networks like Facebook, Twitter, MySpace, Google+ and other networks. Here the SON Engine can be designed to handle support for various social networks as plugins, so that additional social networks can be easily added to the system; 4) a Persistence Layer, which may act as the system Relational Database RDBS system, and may, for example, for scalability and availability, be based on shard MySQL instances or other database method; 5) a Caching layer, here, for example, the caching layer may be in a memory distributed Java environment, where each node has backup on at least on other node. Here all data may be kept in memory (e.g. system RAM) as long as possible. Thus data in the cache may persist in the persistence layer asynchronously, and may be read from the database when it doesn't synchronously exist in cache; 6) a CDN (content distribution network)—here the system static data may be kept in an external CDN service; and 7) an Analytics Engine, which may read data from the cache, and run analytics calculations on the Shaker data.

All components may be monitored by central applicative monitoring and managing software with special features dedicated to the Agora/Shaker environment. The various software components can usually scale exponentially (some can scale linearly). All component configurations can be dynamically changed by the Agora/Shaker monitoring and managing system. In certain cases, the Google MapReduce software framework methods, as exemplified by U.S. Pat. No. 7,650, 331, the contents of which are incorporated herein by reference, may be used. These methods were also discussed in appendix 1 of provisional application 61/394,151, and contents of appendix 1 of this disclosure are also incorporated herein by reference.

Creating a Social Interaction Platform, Layered Over a Social Network

The operating philosophy behind the software design and functionality of Agora/Shaker (Shaker) is that Shaker should mimic many aspects of real life. Indeed, the default Agora/Shaker software design assumption, unless otherwise stated, is that the various software features in Shaker will mimic real life as closely as possible in the Shaker's Internet based, graphical user interface (GUI) platform, as viewed by the various users using their respective computerized devices. Users will generally interact with Shaker using the same standard web browsers that they use to interact with Facebook, Google+ and other social networks. Indeed, often Shaker may be accessed and viewed within the context of a social network interface and web page.

Thus in the preferred embodiment, and contrary to prior art virtual worlds which create new virtual networks where users play characters other than themselves, Shaker relies on one or more social networks (such as Facebook and Google+) to provide Shaker with a real-life user base, where the user Avatar is taken from the user's social network information (e.g. photo, user identification, user supplemental information, user friends, user friends of friends, and so on). In Shaker, users do play characters that resemble themselves, or expressed alternatively, since they are portrayed by their real social network profile, the users "come as themselves".

Obtaining Real World Information on the User Base from Social Networks and Importing this to the Virtual World.

As previously discussed, unlike prior art virtual worlds that maintain their own user base were users invent new identities, Shaker relies on existing real social networks for a user base. Moreover, Shaker intentionally preserves the real-life identities of the users, as reflected in their social network profiles, and uses this real world identity information to represent users in Shaker's various virtual online social events.

Additionally, Shaker provides users with virtual social events that are much more suitable for solving the general problem of "meeting new people that are relevant to my real-life situation".

The solution Shaker provides includes a software methodology and data structure that enables Shaker's system to be run as a layer easily placed over any social network. Further, Shaker's methods project Shaker's users into a virtual social event as avatars that "carry" the user's previously established social profile. Shaker also provides easy to use graphical methods to allow other members, with proper permissions, to access another user's social profile in real-time from within a Shaker virtual online event.

By contrast, although prior art Facebook applications may use Facebook's user base for members, once members are enrolled, the prior art Facebook applications then go and generate yet another layer of application user profiles. This second layer of application user profile operates to shield or hide much of the Facebook profile data from the users of the application. For example, in Facebook application, although Facebook friends can help tend the Farmville user's farm, the application otherwise makes little use of the Facebook user profile data. Thus this application may be good for growing imaginary farms, but otherwise relatively useless for creating new and mutually beneficial social contacts that can be of utility in the real world as well.

GeoChat: Proximity Based Multiple Conversations in a Semi-Realistic Virtual Environment.

To facilitate new social interactions in the virtual world, users are typically provided with the availability to allow their avatars to converse in a virtual world analogy to a typical party conversation. This option is referred to here as "GeoChat". As will be discussed in more detail shortly, GeoChat is a series of methods and algorithms designed to allow avatars, while conversing in the virtual world, to automatically be positioned and interact in a way that closely simulates many of the unspoken rules that govern positioning and interacting in real-world conversations. Additionally various "stage presence" techniques used by actors to draw audiences into the "virtual worlds" of the stage, movies, and TV may also be employed.

In the GeoChat option, a group of user avatars, when engaged in conversation, may be shown in the various user's GUI as standing close to one another and facing in a natural way that takes various considerations into account, such as the positioning of the virtual furniture, the direction where real-life conversation participants might face, and also potentially other factors such as the viewpoint of the various users who are observing the virtual world from the standpoint of their various computerized device's GUI. Here the Agora/Shaker computer system may, for example, automatically select the participants of the conversation based on their proximity to the conversation initiator. In addition, the sequence of joining an existing conversation depends on the type of conversation, public or private, thus moderating the level of control that current participants of the conversation have over the conversation.

As will be discussed, in addition to considering information derived from real world social network data, the invention's PTI methods often also keep track of the user's history of virtual world conversations (i.e. GeoChats), as well as other virtual world interactions. Here the idea is that a more extensive virtual world history of interactions is also a good predictor of the respective user's future probability to interact (PTI).

To elaborate further, Agora/Shaker's GeoChat function provides a virtual world environment that, like the real world, permits and indeed encourages proximity based group conversations. The Agora/Shaker system, while often not monitoring the specifics of the "GeoChat" conversations out of privacy concerns, can nonetheless extract useful information from the GeoChat sessions that can be useful in subsequent PTI calculations.

Examples of Agora/Shaker in operation are shown in the following Figures.

FIG. 4 shows an example of an Agora (Shaker) event, here shown embedded within a standard Facebook social network page. The link will take interested Facebook users to the Agora (Shaker) event. Here the type of event (a birthday), time of the event, Shaker link, and who created the event are shown. The user Alan Parson (402) is about to click on the link that (400) opens up the Agora (Shaker) party interface page. Some of the other social network members that are currently attending this party are shown as (404)

Figure 5:
FIG. 5 shows an overview of an Agora/Shaker virtual birthday party, here illustrated as operating within the associated social network system (here Facebook) to emphasize the social network connection.

FIG. 5 shows a picture of the ongoing Agora/Shaker virtual birthday party. Here various male and female avatars are shown interacting in a virtual bar setting, and the Facebook profile photos of the avatar's various real-world users are shown linked to the avatars. This virtual room is shown in the graphical user interface of Alan Parson's computerized device in 2½ dimensions. Alan Parson is both observing the room from his detached observer's perspective, essentially located in a corner of the room's ceiling, while at the same time, Alan Parson is also controlling his avatar, shown in FIG. 6. Here the X,Y plane of the 2½ dimensional room is represented by the room's floor (e.g. the checkerboard dance floor, and the like), while the Z axis of the 2½ dimensional room is shown extending upward from this floor. Note that in this perspective, all avatars have the same approximate size regardless of their distance from the observer.

FIG. 6 shows a close up of the user's (here Alan Parson's) avatar (600), showing his associated social network photograph (602). This avatar represents the point of view of the user who has just clicked on the link in FIG. 4, and is also the main point of view for the purposes of this disclosure.

The other avatars represent other people who are present in the Shaker virtual party in real time. Often the figures will be color coded. Thus, for example, figures may be color coded blue to represent the direct Facebook friends of the user from FIG. 6, while the indirect "Friends of Friends" of the user may be given a different color, such as yellow. By contrast, avatars being run by Facebook strangers to the user in FIG. 6 can be given a third color, such as gray. Note that although the present application figures, being rendered in black and white as per drawing requirements, do not show these colors, the colors may be found in the corresponding images from provisional application 61/394,151, incorporated herein by reference.

The users can usually command the avatars by mouse click or button push (or by finger swipe or even by hand motion or verbal command), to walk around the Shaker virtual party (here shown in 2D isometric format). Just as in the real world, the Shaker avatars can walk around, dance, chat, and go to the bar and have a "drink". Here, even though the user from FIG. 6 has not yet joined a particular conversation, the user, although not able to see the details of the conversation, can at least see that others are talking to each other by way of their conversation balloons. Here, due to the previously described GeoChat feature, the conversing users are physically close to each other.

Once the user has stepped close enough to the other participants, (e.g. FIG. 7), the user can now see the other user's comments in the chat box (702), and also enter his or her own comments. The chat box can also show exactly who is now participating in the conversation. This is shown at the bottom of FIG. 7.

Figure 7:
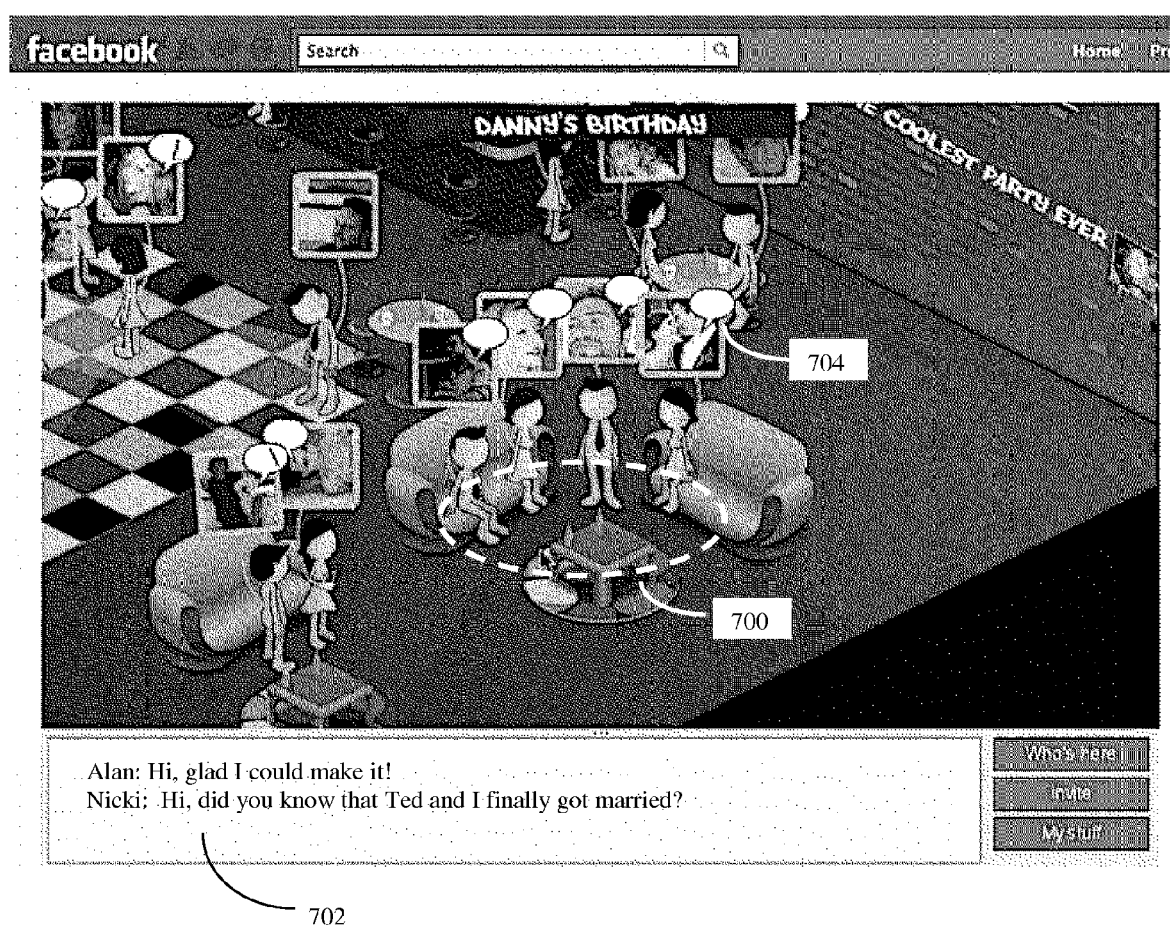
FIG. 7 shows an overview of the portion of the virtual room where an avatar virtual conversation is taking place.

FIG. 7 shows an overview of the portion of the virtual room where an avatar virtual conversation (GeoChat) (700) is taking place, and also shows one type of GeoChat text interface (702). Many alternative GeoChat text interfaces are possible, and in other embodiments, the GeoChat interface may be an audio interface, allowing the various GeoChat participants to speak and talk directly using suitable audio equipment.

Further Discussion of GeoChat Methods.

GeoChats may be viewed as being proximity based multiple conversations in a semi-realistic virtual environment. In the GeoChat option, a group of user avatars, when engaged in conversation, are shown in the user GUI as standing close to one another and often oriented or facing in a direction that may be approximately near the center of the conversation.

In some embodiments, the system may automatically select the participants of the conversation based on their proximity to a conversation initiator. In addition, the sequence of joining an existing conversation may depend on the type of conversation, public or private, thus moderating the level of control that current participants of the conversation have over the conversation. That is, conversation participants occasionally may designate a given conversation as locked/private/do not disturb, in which case this conversation will be closed to new members. More commonly however, conversations will be open and new members will be welcome, because the Agora/Shaker system is designed to encourage new relationships.

As in real life, the space that the conversations take place in imposes certain restrictions on the position of the various avatars in the virtual room. For example, though perhaps separated by only a small distance by a virtual wall, as in the real world, avatars separated by such a virtual wall will not normally converse. Further, the Agora GeoChat algorithm takes into account the physical structure of the room in order to mimic this behavior, making for a more interesting and realistic conversation environment. As will be discussed, one way that this is done is through the use of "marks", which are designated regions or points on the virtual world which can be used to control avatar position and orientation.

As can be seen in FIG. 7, the avatars of members involved in a particular conversation may indicate their "being in a conversation" status though the use of various markers and icons, such as (for example) representations of cartoon speech balloons (704). In this example, the actual speech text may be relegated to the chat box (702) to avoid otherwise cluttering the user interface with text. Thus, for example, when a user's avatar enters into a conversation, a speech balloon (704) may appear above the user avatar's head, and when a user leaves a conversation, this speech balloon may then disappear. The speech balloon can also convey other information, such as showing a pencil or other symbol when the user is typing a new response.

The chat (702) box will let the user know exactly who can listen (read) or hear the user's messages and who can respond.

Avatar Positioning Methods

Having now defined the overall context of the invention, our discussion now shifts to a more detailed discussion of the invention's various avatar control methods.

As previously discussed, in one embodiment, the invention may be an automated method for arranging the positions of a plurality of avatars during a virtual conversation that is visualized in a three or 2½ dimensional space computer graphical user interface by an outside observer. Here, each avatar will have a "front face", e.g. a preferred orientation for conversation.

According to the method, the computer system will determining the location of the various avatars relative to each other and relative to the location of one or marks in the vicinity of this group of plurality of avatars. Here, these "marks" are locations in the virtual environment that can impart a preferred avatar orientation to an avatar that is standing or sitting above the marks, or that has clicked on the marks. These marks can best be understood in the same context as the "marks" that are used to give stage directions to human actors. That is, the marks can be viewed as essentially impart instructions to the avatar (e.g. to the computer system controlling the avatar) that standing or sitting above the marks to face in a certain direction. For example, if the mark is incorporated into a virtual "chair" or "couch" in the virtual room, than an avatar clicking on that chair or couch would both sit on the chair or couch, and face in the direction imposed by that particular mark. This feature allows the virtual room designers to arrange the virtual furniture in a way to produce conversation areas, just as real world designers will create conversation areas in real world buildings.

Other examples of marks include corners of a virtual room, edges of the virtual room, selected regions near plants, selected regions near counters, tops of counters, tops of tables, selected regions near doorways, and other virtual room regions as desired.

Figure 8:
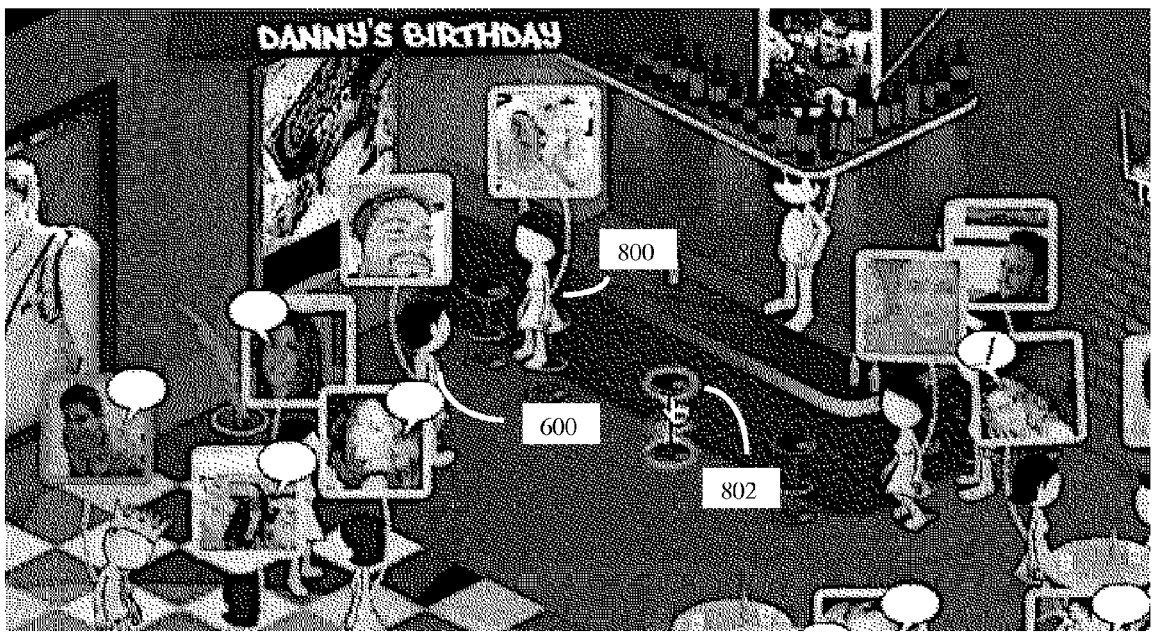
FIG. 8 shows a virtual bar portion of the Agora virtual party room. Here the user has clicked on a virtual bar stool, which contains a non-visible avatar position (and orientation) marker.
Figure 8A:
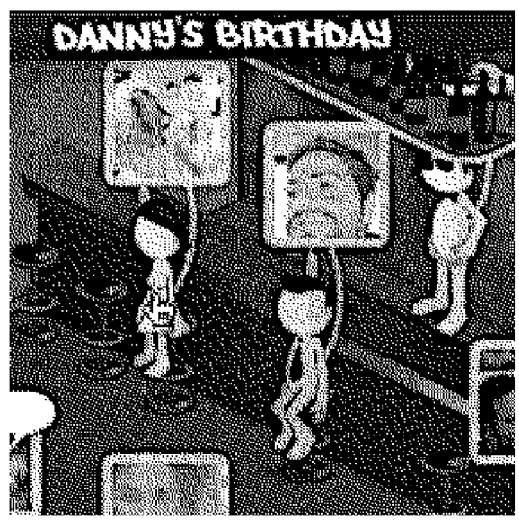
FIG. 8A shows that the user's avatar sitting on the virtual bar stool, facing the direction as controlled by that bar stool's avatar position (and orientation) marker.

FIGS. 8 and 8A show examples of how marks embedded in various virtual environment items can control avatar behavior, position, and orientation. In FIG. 8, a first avatar (800) is shown sitting on a virtual bar stool which contains a hidden mark that causes the avatar to face outwards towards the room, rather than inwards to the bar. The user controlling the avatar (600) previously shown in FIG. 6 has clicked on a second bar stool (802) that contains its own hidden mark. When the user's avatar (600) approaches bar stool (802), this hidden mark will direct the avatar to now face outward from the bar as well, as is shown in FIG. 8A.

Note that for these methods, often the avatar images shown by the graphical user interface will be able to face in a variety of different orientations, at various angles from the user/observer, as is shown in FIG. 9. Usually at least four different angles or orientations are required, and more positions (e.g. six positions, eight positions, or higher) are desirable.

FIG. 10 shows more details of how marks can be used to control avatar orientation at key points in the virtual room or virtual world.

In FIG. 10, the marks (which are essentially regions of the virtual room that are known by the computer system running the virtual room to impart certain characteristics to avatars that may either click on the mark, or stand within a very close radius of the mark), are shown as the "X" and arrow symbol at various locations (1000, 1002, 1004, 1006, 1008) in the virtual room. Here the "X" is intended to represent the location of the mark, while the arrow is intended to represent the orientation that the mark imparts on any avatar that interacts with the mark by clicking on the mark region or by standing or sitting over the mark.

Note that marks can be embedded or incorporated in furniture and other items, such as couches (1010, 1012). Thus marks (1002 and 1006) are embedded in couch (1012), while mark (1004) and another mark (not shown) are embedded in couch (1010). Some marks can also be simply associated with points or areas of the virtual room, such as mark (1000).

FIG. 10 shows a virtual room at two points in time. In the earlier time point (1020), a two person conversation may have started between two avatars (1024) and (1026). The orientation of avatar (1024) may be controlled by marker (1006) which is embedded in couch (1012). Thus avatar (1024) is a "marked avatar". The orientation of avatar (1026) may also be controlled by a marker embedded in couch (1010) (not shown).

The other avatars (1028, 1030, 1032) have not yet joined this conversation. Further, since avatars (1028, 1030, and 1032) are not yet associated with markers, they are termed "unmarked avatars". By contrast in the later time point (1022), the previously unmarked avatars (1028, 1030, and 1032) have moved, joined the conversation, and have also interacted with their respective marks (1004, 1002, and 1000). These avatars are now "marked avatars". Thus unmarked avatar (1028) is now marked avatar (1040), unmarked avatar (1030) is now marked avatar (1042), and unmarked avatar (1032) is now marked avatar (1044). These newly marked avatars are now oriented as imparted by marks (1004, 1002, and 1000).

However just as in a real party environment, some attendees may be sitting, while other attendees around them may be standing. Thus, in addition to using marks to optionally position the avatars, according to the invention, for those free-standing (unmarked) avatars that are not positioned above said marks, then, the system (e.g. the processor and software) will generate a convex hull based on the (X, Y) location of all marked and unmarked avatars, as well as the preferred avatar orientations of said marked avatars. Here, the system will further use the constraint that the preferred avatar orientations of said marked avatars must generally face the interior of this convex hull.

Convex hull algorithms or methods are defined in mathematics as being the smallest convex envelope that can surround a set of points in space. See, for example, chapter 33.3 (pages 1029-1039) in Cormen et. al., Introduction to Algorithms, Third Edition The MIT Press, Cambridge Mass. (2009), the contents of which are incorporated herein by reference.

Various algorithms and methods may be used to compute complex hulls, including the Gift wrapping (Jarvis match) approach, the Graham scan approach, the QuickHull approach, the Divide and conquer approach, the Monotone chain approach, the incremental convex hull algorithm, the marriage before conquest algorithm, Chan's algorithm and others. Here, the main advantage of convex hull methods over earlier and more simplistic methods, such as drawing a circle with a defined radius and having the avatars all stand a constant distance from the center of the circle, is that convex hull methods can be more realistic (i.e. can better accommodate distortions in avatar position caused by objects such as furniture and the like). Further as will be discussed, convex hull methods are better suited because they can be used to deliberately distort the pattern of conversing avatars away from an ideal circle arrangement to a more complex arrangement that takes other considerations such as "stage presence" (i.e. distorting the conversation shape to make it appear more inviting to an outside observer), attraction to local high PTI nonconversing avatars, furniture, and the like.

As previously discussed, and as can be seen in FIGS. 5-8A, although three dimensional virtual worlds can be used, often it is useful to portray the virtual world or virtual room in which the avatar social interactions are taking place in a 2½ dimensional space representation that is shown on the graphical user interface (often a web browser interface) on the various user's computerized devices (300). FIG. 11 shows a diagram of a view of an avatar populated virtual room from the user's observer perspective (1100). Here the observer's eye is looking at the virtual room from a perspective that is somewhat near the ceiling of the room, and somewhat opposite to the origin of the room's 2½ dimensional coordinate axis (1102). The room's "X" axis is shown as (1104), the room's "Y" axis is shown as (1106), and the room's "Z" axis is shown as (1108).

In this room there are two groups of conversing avatars: group 1 and group 2. In group 1, the avatars are standing on the perimeter of the group's convex hull (1110). In group 2, the avatars are also standing on the perimeter of the group's convex hull (1112) as well; however note that the distribution and orientation of the avatars in the two groups are different.

In group 1 (1110), the avatars are essentially ignoring the perspective of user observer (1100), and instead are simply interacting with each other as if they were not being observed by outside observer (1100). The net effect is to create the impression that group 1 is not at all interested in interacting with the user observer (1100). The group 1 avatars are not looking even slightly in the direction of user observer (1100), there is no gap in the group 1 conversation "ring", and one avatar (1114) even has his back totally turned towards the user observer (1100). Instead the orientation of the group 1 avatars (1100) is turned towards the mathematical center of the group 1 complex hull or other shape (1116). In addition to the fact that group 1 is violating a lot of unwritten acting rules (i.e. the avatars have no "stage presence" because they are ignoring the "audience"), group 1 is also sending a non-verbal message that they are not at all interested in having the user observer send the user's avatar to join them. This avatar configuration thus discourages formation of new social interactions, and unless group 1 has an explicit wish to signal that they are engaged in a locked private conversation, it is counterproductive to convey this type of non-verbal message to the user observer (1100).

By contrast, consider the avatars in group 2 (1112). Here, according to the invention, the avatars are oriented in a way that both has better "stage presence" in the acting sense, and also sends a more inviting non-verbal "feel free to join in" message to the user observer (1100). In particular, note that the orientation of the avatars in (1112), instead of being directed towards the mathematical center (1118) of convex hull (1112), is instead turned somewhat towards the projection of the user observer's (1110) location on the virtual room's x, y plane (1120).

Note that here, a line segment can be drawn between the mathematical center of convex hull (1112) and the projection of the user observer's viewpoint location onto the x, y plane.

Where should the avatars in group 2 (1112) be oriented? If they are all oriented towards the center of the convex hull (1118), then the avatars send a non-verbal "we are not interested in you" message to user observer (1100). If the avatars are all oriented towards the projection of the user observer's (1110) location on the virtual room's x, y plane (1120), then the results will look unnatural because it suggests that the group 2 avatars have no interest at all in conversing among themselves. As a compromise, often the optimal solution is to orient the group 2 avatars towards a point (1124) on a line segment (1122) between the center of the convex hull (1118) and the projected observer viewpoint location in the X,Y plane of the three dimensional or 2½ dimensional space (1120).

The position of orientation point (1124) on line segment (1122) can be determined by various methods. In some embodiments, this can be a simple function such as: start at location (1118), and place (1124) at ⅓ the distance towards the projected observer view point location (1120). In more interesting and sophisticated embodiments, however, the location of orientation point (1124) can be controlled by the system to impart useful non-verbal information to the user observer (1100). For example, if the group is a group of complete strangers (with a low overall PTI) for user 1100, or are having a private conversation not open to outsiders, then the location of orientation point 1124 can be placed close to the center of the convex hull (1118), thus producing a "we're ignoring you" non-verbal message similar to group 1 (1110). If the avatars are close friends (high PTI) to the user observer, and are open to having further members join the conversation, then the orientation point (1124) can be moved closer to the projected observer viewpoint location (1120). This allows the user to quickly scan a virtual room and almost intuitively select the most promising conversations to join.

Figure 12:
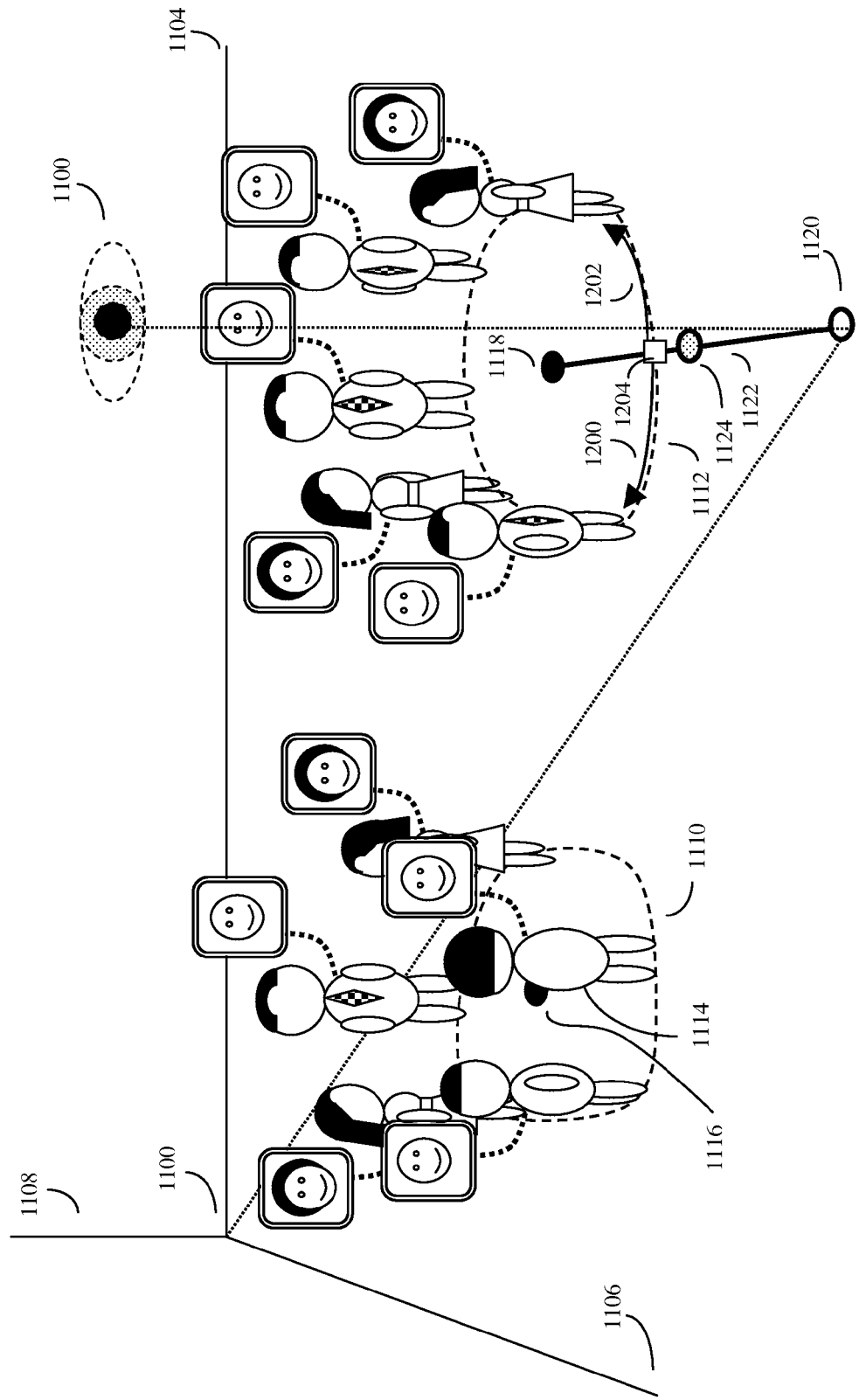
FIG. 12 shows how a conversation group of avatars may be distributed and oriented along the perimeter of a convex hull in a manner that takes the user observer's relative position into account.

FIG. 12 shows another aspect of the invention. In addition to having the avatars in a conversation somewhat orient towards the user observer (1100) projected observer viewpoint location (1120) or orientation point (1124), it is psychologically useful to also have the avatars somewhat spread apart along the axis of line segment (1122). This can be done by different methods. In a first method, discussed below, the shape of the convex hull (1112) remains unchanged, but the avatars are instructed to rearrange their locations somewhat along the perimeter of the convex hull (1112) in a manner that spreads the avatars apart (1200), (1202) away from the intersection (1204) between the line segment (1122) and the convex hull (1112).

Alternatively, which will be discussed later in the specification, an "invisible avatar" (actually an X,Y position representing the user, which will be called an "invisible avatar") may also be assigned to the observer. This invisible avatar, which is different from any visible avatar that will often also be assigned to the user, essentially represents the user observer's viewpoint. This invisible avatar is located somewhat according to the virtual line of sight of the user observer, such as somewhere along line segment (1122). This may be a position such as (1204), (1124), or elsewhere. The X,Y position of this invisible avatar may be also factored into the group 2 convex hull calculations, thus generating an alternate observer biased group 2 convex hull that somewhat distorts the shape of the conversation "ring" in the direction of the user observer projection (1122). As yet another embodiment, if an avatar controlled by user observer (1100) passes near group 2, then in some embodiments, if there is a high probability to interact (PTI) between the conversation group members, and the user observer avatar, then the shape of the conversation's convex hull may be slightly distorted towards the user observer's avatar as well.

Returning to the first method, shown in FIG. 12, in this embodiment, the avatar separation (1200), (1204) can be done by automatically positioning the unmarked avatars (that is free standing avatars who's position or orientation is not controlled by marks) along the perimeter of the convex hull (1112), determining the center of the convex hull (1118), and determining a line segment (1122) between said center of the convex hull (1118) and the projected observer viewpoint location (1120) and then distributing the unmarked avatars along the perimeter of the convex hull (1112) in a manner that biases (1200), (1202) the distribution of the unmarked avatars away from the line segment (1122).

Figure 13:
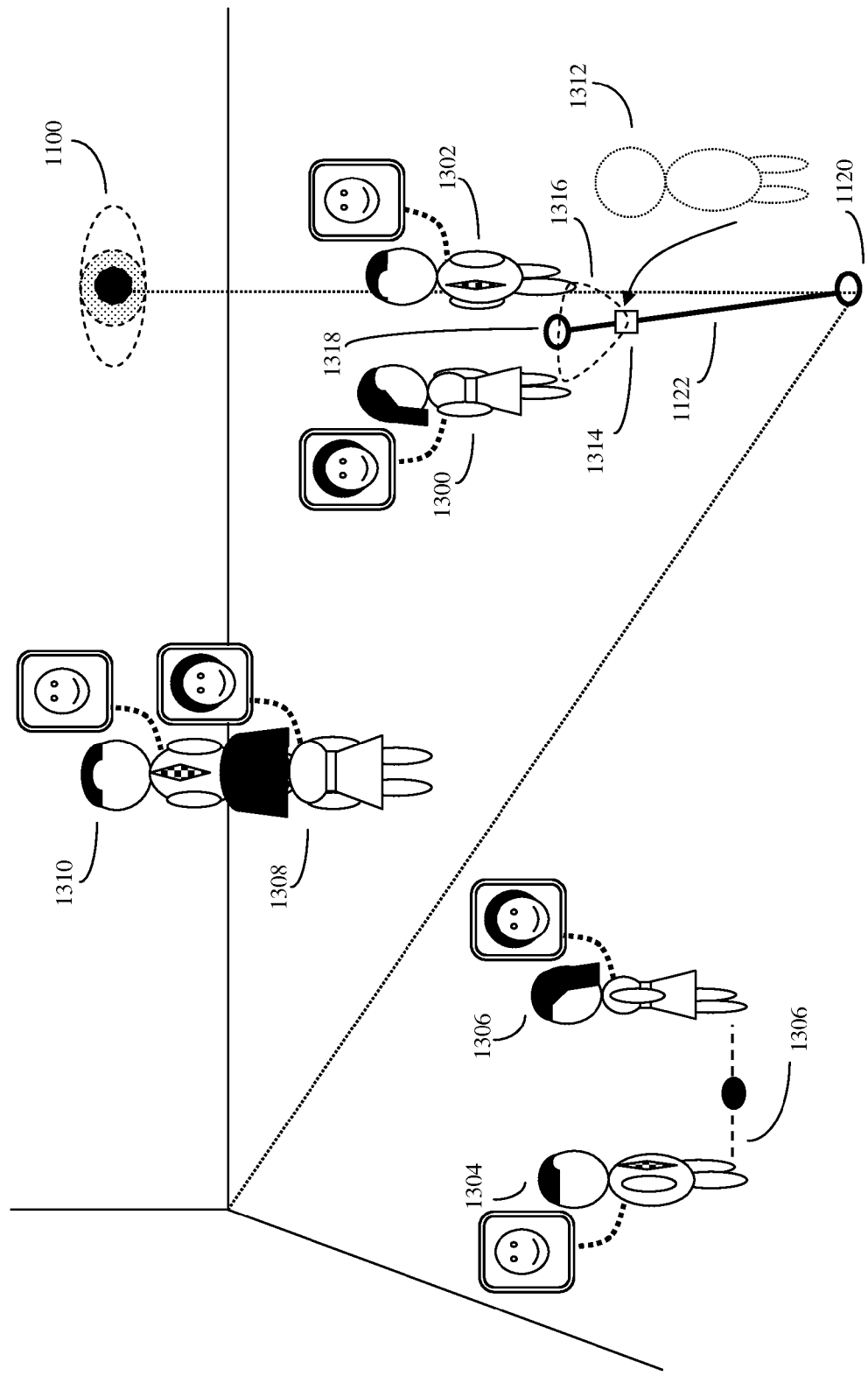
FIG. 13 shows how the shape of the convex hull generated from the position of conversing avatars may be distorted or influenced by the user/observer's relative position.

FIG. 13 shows how the shape of the convex hull generated from the position of conversing avatars may be distorted or influenced by the user/observer's relative position, or alternatively by the location of a nearby avatar with a high probability to interact (PTI) with the conversing avatars. In FIG. 13, two avatars (1300) and (1302) are conversing. Absent any bias or "stage presence" caused by the projected observer viewpoint location in the X,Y plane of the three dimensional or 2½ dimensional space (1120), then the two avatars would normally simply be directly facing each other, as is the case for avatars (1304) and (1306), as well as avatars (1308), and (1310). In this two avatar conversation case the convex hull degenerates to a simple line (1312).

Here the bias in the complex hull encompassing the conversing avatars (1300) and (1302) can be viewed as an influence caused by the X, Y location of a missing observer avatar viewpoint or alternatively an invisible observer avatar (1312). As before, this represents the user observer's viewpoint. In this particular example, this user observer viewpoint is different from any user avatar that might also be in the scene, but in an alternative embodiment, distortions in the conversation complex hull induced by the user's actual avatar might also be created by a similar mechanism. In this example, the invisible observer avatar (1312) is assigned a location (1314) on the line segment (1122), and a new observer biased complex hull (1316) is generated based on the positions of the avatars participating in the conversation (1300, 1302) as well as the X, Y location (1314) of the invisible observer avatar (1312). The orientation and/or distribution along the perimeter of the new complex hull of at least the unmarked avatars can then be automatically adjusted by the system. The net effect, as can be seen in the relative position and orientations of avatars (1300) and (1302) is to both make the existing conversation still look natural, while again conveying non-verbal cues to the user observer (1100) that his or her participation in the conversation is encouraged. Again as before, this effect can be reduced or eliminated if the conversation is private, or if PTI calculations suggest that the probability to interact between the user observer (1100) and the other members of the conversation is too low. Again the net effect of this embodiment of the invention is to improve overall efficiency of forming new and useful online social interactions. This is because the user can now quickly glance at the virtual room, and almost instantly pick up non-verbal cues as to which conversations are most promising to join.

Put alternatively, in some embodiments, the invention can operate by determining the center location of the complex hull encompassing conversing marked and unmarked avatars, and then determining a line segment between this center location projected the observer viewpoint location. The computerized system can then automatically determine a missing observer avatar point on this line segment, and use this observer avatar point and the position of the other avatars to construct a new convex hull. This new convex hull can then be used to control the distribution and/or orientation of the various unmarked avatars along the perimeter of this new convex hull.

As before, the magnitude of this effect can be flexibly varied from no effect to a substantial effect, as desired by the system operators and/or users. For example, the displacement of the missing observer avatar point (1314) on the line segment (1122) away from the end point of the line segment representing the former center location of the avatars (1318) can vary as a function of the average distance between the avatars in the virtual conversation, and also be controlled by a coefficient or function which may be a conversation and/or a user or system set observer displacement variable.

FIG. 14 shows how a user may click on a region (1316) within the complex hull generated by conversing avatars (and possibly an invisible observer avatar (1312) that represents the vantage point of the user), to move the user's avatar (1402) to join an ongoing conversation (also represented by 1316). In this embodiment, when the joining avatar (1402) joins the conversation, the joining avatar can be automatically repositioned to the existing perimeter of the ongoing conversation convex hull (1316). However in an alternative and somewhat preferred embodiment, the convex hull of this conversation may be recalculated (1404) to incorporate the position of this joining avatar, and the joining avatar may then be automatically repositioned (1406) to the perimeter of this recalculated convex hull. As before, the convex hull of the conversation may also be influenced by the previously discussed invisible observer avatar (1312).

Note in FIG. 14, the user is shown as being represented by two different avatars. The user's actual or visible avatar is initially represented by (1402) and later by (1406). By contrast, the user's "invisible observer avatar" or "missing observer avatar", used to distort the shapes of the conversation convex hulls, displace conversing avatars, and orient avatars in a manner that conveys useful non-verbal social information to the user of avatar (1402) is shown as the dotted line invisible avatar (1312).

Just as the convex hull can be used to create a clickable area to join a conversation, so also the convex hull can be used to designate a clickable area or areas that can be used to leave a conversation. Here for example, conversing avatars may leave a conversation by clicking on a region of the virtual space that is outside of the perimeter of the convex hull, or outside of a predetermined maximum distance from the perimeter of the convex hull.

In order to get greater control over conversation areas, various other constraints may be automatically imposed by the computer system that controls the system server(s) as well. For example, in some embodiments, the maximum area of a conversation's convex hull or maximum distance across any two points on the perimeter of this convex hull may preset so as not to exceed a maximum area or maximum distance setting.

Other Considerations:

Just as in real life, it would be considered rude to walk between members of a conversing group, so also in the virtual world, the system may enforce similar rules of courtesy. Here for example, avatars not joining a particular conversation may be automatically directed by the system to walk around the region bounded by the convex hull of that particular region.

Other Dynamically Arranging Avatars Based on Probability to Interact (PTI) Embodiments.

The virtual worlds or rooms discussed in this specification are dynamic places. Although avatars engaged in a conversation will often remain in approximately the same region of the room, these avatars are free to come and go, and can move about the room.

In some embodiments, the shape of a virtual conversation's complex hull, and or the distribution and orientation of conversing avatars along the perimeter of the virtual conversation's complex hull may be dynamically influenced by the Probability to interact (PTI) between the various conversation members, and a member controlling a nearby avatar that may be passing by a conversation.

As before, these PTI methods may be as described in U.S. patent application Ser. No. 13/275,186, the contents of which are incorporated herein by reference.

In the dynamic PTI implementation, if there is a high PTI between a member controlling a nearby avatar, and the members controlling the avatars involved in the conversation, then the distribution of the avatars in the conversation may dynamically readjust as a non-conversing moving avatar passes by the conversation. For example, for high PTI interactions, the avatars in the conversation may slightly shift position (i.e. making space for, shifting in orientation slightly towards) a nearby non-conversing avatar when this moving avatar passes close to the conversation, and then shift back to their original position when the moving avatar walks further away. Again this is somewhat inspired by real life parties, where for example if you pass by a conversing group of close friends, they may slightly shift position to signal that they would like you to join, but then return back to their original position if you move further away.

This dynamic shifting and reorientation of the conversing avatars can thus send further useful non-verbal cues as to the desirability of joining into a particular conversation. Here the methods may generally be as previously described for the user/observer, but in this case the direction of orientation will be towards the nearby non-conversing avatar (e.g. FIG. 14 (1402)), and the overall PTI between the non-conversing avatar and the other conversation members can be used to control the relative magnitude of the effect—from zero effect for low PTI, to clearly noticeable effect for high PTI.

Thus in this scenario, as in real life, if the avatar of a very good friend of the other group members passes close to the conversing group avatar, the other avatars will acknowledge the presence of the good friend's avatar non-verbally and will make way for (spread apart somewhat, face slightly towards) the good friend's avatar, thus giving encouragement for the good friend to participate. By contrast, a group of strangers or a group engaged in private conversations can chose (e.g. the system can be set to) ignore the moving avatar.

The invention claimed is:

1. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

wherein said marks are embedded in objects in said virtual world, wherein said objects comprise one or more objects selected from the group consisting of furniture couches, chairs, corners of the room, edges of the room, selected regions near plants, selected regions near counters, tops of counters, tops of tables, and selected regions near doorways;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull; and using said at least one computer processor to automatically position said unmarked avatars along the perimeter of said convex hull;

wherein said at least one computer processor is further configured to understand the user generated signal that avatars may leave a conversation by clicking on a region of the virtual space that is outside of a predetermined maximum distance from the perimeter of said convex hull.

2. The method of claim 1, wherein said outside observer has a viewpoint that is projected, by said at least one computer processor to a projected observer viewpoint location in the X, Y plane of said three or 2½ dimensional space; and after automatically positioning said unmarked avatars along the perimeter of said convex hull, then using said at least one computer processor to automatically assign said unmarked avatars a preferred avatar orientation that is facing an orientation that is on a point on a line segment between the center of said convex hull and said projected observer viewpoint location in the X,Y plane of said three or 2½ dimensional space.

3. The method of claim 2, wherein the displacement of said point on said line segment away from said center of said convex hull and towards said projected observer viewpoint is determined by said computer processor at least in part by the Probability To Interact between said outside observer and said members controlling said marked and unmarked avatars.

4. The method of claim 1, wherein said outside observer has a viewpoint that is projected, by said at least one computer processor, to a projected observer viewpoint location in the X,Y plane of said three or 2½ dimensional space;

using said at least one computer processor to automatically position said unmarked avatars along the perimeter of said convex hull;

using said at least one computer processor to automatically determine the center of said convex hull, and automatically determine a line segment between said center of said convex hull and said projected observer viewpoint location in the X,Y plane of said three or 2½ dimensional space; and using said at least one computer processor to automatically distribute said unmarked avatars along the perimeter of said convex hull in a manner that biases the distribution of said unmarked avatars away from said line segment.

5. The method of claim 4, wherein the magnitude of said bias is determined at least in part by the Probability To Interact between said observer and the members controlling said marked and unmarked avatars.

6. The method of claim 1, wherein said convex hull designates the conversation area, and a new user may direct his or her joining avatar to join an ongoing conversation by clicking within the region bounded by said ongoing conversation convex hull, and wherein when said joining avatar joins said ongoing conversation, said joining avatar is either automatically repositioned, using said at least one computer processor, to the existing perimeter of said ongoing conversation convex hull, or the convex hull of said ongoing conversation is recalculated, using said at least one computer processor, to incorporate the position of said joining avatar, and said joining avatar is automatically repositioned to the perimeter of said recalculated convex hull using said at least one computer processor.

7. The method of claim 1, wherein said outside observer has a viewpoint that is projected, by said at least one computer processor, to a projected observer viewpoint location in the X,Y plane of said three or 2½ dimensional space;

using said at least one computer processor to automatically determine the center location of said marked and unmarked avatars;

using said at least one computer processor to automatically determine a line segment between said center location and said projected observer viewpoint location in the X,Y plane of said three or 2½ dimensional space;

using said at least one computer processor to automatically determine a missing observer avatar point on said line segment;

and using said missing observer avatar point on said line segment, and said at least one computer processor to automatically construct a convex hull based on the location of all marked and unmarked avatars and the missing observer avatar point on said line segment.

8. The method of claim 7, wherein said missing observer avatar point on said line segment is automatically displaced away from the end point of said line segment representing the center location of said marked and unmarked avatars;

wherein said displacement varies as a function of the average distance between the avatars in said virtual conversation, and a user or system set observer displacement variable;

and wherein said displacement is also automatically determined at least in part by the Probability To Interact between said observer and the members controlling said marked and unmarked avatars.

9. An automated method for arranging the positions of a plurality of avatars during a virtual conversation, that is visualized in a three or 2½ dimensional space computer graphical user interface by an outside observer with a viewpoint that is projected by at least one computer processor, to a projected observer viewpoint location in the X,Y plane of said three or 2½ dimensional space, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull;

using said at least one computer processor to automatically position said unmarked avatars along the perimeter of said convex hull, and assign said unmarked avatars a preferred avatar orientation that is facing an orientation that is on a point on a line segment between the center of said convex hull and said projected observer viewpoint location; and using said at least one computer processor to automatically distribute said unmarked avatars along the perimeter of said convex hull in a manner that biases the position of the unmarked avatars away from said line segment.

10. The method of claim 9, wherein said marks are embedded in furniture or other regions in said virtual world.

11. The method of claim 10, wherein said furniture or other regions comprises couches, chairs, corners of the room, edges of the room, selected regions near plants, selected regions near counters, tops of counters, tops of tables, and selected regions near doorways.

12. The method of claim 9, wherein said at least one computer processor uses said convex hull to designate the conversation area, and a new user may instruct said at least one computer processor to direct his or her joining avatar to join an ongoing conversation by clicking within the region bounded by said ongoing conversation convex hull, and wherein when said joining avatar joins said ongoing conversation, said joining avatar is either automatically repositioned by said at least one computer processor to the existing perimeter of said ongoing conversation convex hull, or the convex hull of said ongoing conversation is automatically recalculated by said at least one computer processor to incorporate the position of said joining avatar, and said joining avatar is automatically repositioned to the perimeter of said recalculated convex hull.

13. The method of claim 9, wherein avatars not participating in said conversation who are positioned within said convex hull are automatically directed by said at least one computer processor, to walk outside of the perimeter of said convex hull.

14. The method of claim 9, wherein the maximum area of said convex hull or maximum distance across any two points on the perimeter may not exceed a preset maximum area or maximum distance setting.

15. The method of claim 9, wherein the relative position of said point on said line segment between the center of said convex hull and said projected observer viewpoint location is automatically moved by said at least one computer processor closer toward said center of said convex hull as said plurality of avatars increase, and is automatically moved by said at least one computer processor closer towards said projected observer viewpoint location as said plurality of avatars decrease.

16. The method of claim 9, wherein generating said convex hull is done by said at least one computer processor automatically computing the smallest convex shape that contains all avatars, and as necessary repositioning the position of unmarked avatars that are inside the perimeter of said smallest convex shape to the perimeter of said smallest convex shape.

17. The method of claim 9;

using said at least one computer processor to automatically determine the center location of said marked and unmarked avatars;

using said at least one computer processor to automatically determine a line segment between said center location and said projected observer viewpoint location in the X,Y plane of said three or 2½ dimensional space;

using said at least one computer processor to automatically determine a missing observer avatar point on said line segment;

wherein the displacement of said missing observer avatar point on said line segment away from the end point of said line segment representing the center location of said marked and unmarked avatars varies as a function of the average distance between the avatars in said virtual conversation and a user or system set observer displacement variable;

and also using said missing observer avatar point on said line segment to automatically construct said convex hull.

18. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

wherein said marks are embedded in objects in said virtual world, wherein said objects comprise one or more objects selected from the group consisting of furniture couches, chairs, corners of the room, edges of the room, selected regions near plants, selected regions near counters, tops of counters, tops of tables, and selected regions near doorways;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull;

using said at least one computer processor to automatically position said unmarked avatars along the perimeter of said convex hull; and wherein avatars not participating in said conversation who are positioned within said convex hull are automatically directed by said at least one computer processor, to walk outside of the perimeter of said convex hull.

19. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull; and using said at least one computer processor to automatically position said unmarked avatars along the perimeter of said convex hull;

wherein said outside observer has a viewpoint that is projected, by said at least one computer processor to a projected observer viewpoint location in the X,Y plane of said three or 2½ dimensional space; and after automatically positioning said unmarked avatars along the perimeter of said convex hull, then using said at least one computer processor to automatically assign said unmarked avatars a preferred avatar orientation that is facing an orientation that is on a point on a line segment between the center of said convex hull and said projected observer viewpoint location in the X,Y plane of said three or 2½ dimensional space.

20. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull; and using said at least one computer processor to automatically position said unmarked avatars along the perimeter of said convex hull;

wherein said outside observer has a viewpoint that is projected, by said at least one computer processor, to a projected observer viewpoint location in the X,Y plane of said three or 2½ dimensional space;

using said at least one computer processor to automatically position said unmarked avatars along the perimeter of said convex hull;

using said at least one computer processor to automatically determine the center of said convex hull, and automatically determine a line segment between said center of said convex hull and said projected observer viewpoint location in the X,Y plane of said three or 2½ dimensional space; and using said at least one computer processor to automatically distribute said unmarked avatars along the perimeter of said convex hull in a manner that biases the distribution of said unmarked avatars away from said line segment.

21. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull; and using said at least one computer processor to automatically position said unmarked avatars along the perimeter of said convex hull;

wherein said convex hull designates the conversation area, and a new user may direct his or her joining avatar to join an ongoing conversation by clicking within the region bounded by said ongoing conversation convex hull, and wherein when said joining avatar joins said ongoing conversation, said joining avatar is either automatically repositioned, using said at least one computer processor, to the existing perimeter of said ongoing conversation convex hull, or the convex hull of said ongoing conversation is recalculated, using said at least one computer processor, to incorporate the position of said joining avatar, and said joining avatar is automatically repositioned to the perimeter of said recalculated convex hull using said at least one computer processor.

22. An automated method for arranging the positions of a plurality of avatars during a virtual conversation that is visualized in a three or 2½ dimensional space computer graphical user interface by an outside observer, each said avatar having a front face, said method comprising:

using at least one computer processor to automatically determine the location of said plurality of avatars relative to each other and relative to the location of one or marks in the vicinity of said plurality of avatars;

said marks being designated regions or points in said avatar's virtual world;

each said marks imparting a preferred avatar orientation to avatars standing or sitting above said marks, thereby producing marked avatars;

for said plurality of marked avatars that are positioned above said marks, then using said at least one computer processor to automatically position said marked avatars in said preferred avatar orientation;

for those plurality of unmarked avatars that are not positioned above said marks, then using said at least one computer processor to generate a convex hull based on the location of all marked and unmarked avatars as well as the preferred avatar orientations of said marked avatars, such that the preferred avatar orientations of said marked avatars generally face the interior of said convex hull; and using said at least one computer processor to automatically position said unmarked avatars along the perimeter of said convex hull;

wherein said outside observer has a viewpoint that is projected, by said at least one computer processor, to a projected observer viewpoint location in the X,Y plane of said three or 2½ dimensional space;

using said at least one computer processor to automatically determine the center location of said marked and unmarked avatars;

using said at least one computer processor to automatically determine a line segment between said center location and said projected observer viewpoint location in the X,Y plane of said three or 2½ dimensional space;

using said at least one computer processor to automatically determine a missing observer avatar point on said line segment;

and using said missing observer avatar point on said line segment, and said at least one computer processor to automatically construct a convex hull based on the location of all marked and unmarked avatars and the missing observer avatar point on said line segment.

* * * * *